(12) United States Patent
Lee et al.

(10) Patent No.: US 7,835,323 B2
(45) Date of Patent: Nov. 16, 2010

(54) SYSTEM AND METHOD FOR TRANSMITTING/RECEIVING DATA IN A MULTICARRIER COMMUNICATION SYSTEM

(75) Inventors: Yong-Hwan Lee, Seoul (KR); Jae-Yun Ko, Uiwang-si (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 1244 days.

(21) Appl. No.: 11/405,827

(22) Filed: Apr. 18, 2006

(65) Prior Publication Data

US 2006/0234704 A1 Oct. 19, 2006

(30) Foreign Application Priority Data

Apr. 18, 2005 (KR) .................. 10-2005-0032131

(51) Int. Cl.
*H04W 4/00* (2009.01)
(52) U.S. Cl. .................. 370/330; 370/203; 370/208; 370/328; 370/329
(58) Field of Classification Search .............. 370/203, 370/208, 328–330, 332
See application file for complete search history.

(56) References Cited

FOREIGN PATENT DOCUMENTS

| JP | 2002-141884 | 5/2002 |
|---|---|---|
| JP | 2003-348047 | 12/2003 |

OTHER PUBLICATIONS

JP 2003-348047 English Translation.*

\* cited by examiner

*Primary Examiner*—Lester Kincaid
*Assistant Examiner*—Charles Shedrick
(74) *Attorney, Agent, or Firm*—The Farrell Law Firm, LLP

(57) ABSTRACT

A multicarrier communication system is provided that divides a full frequency band into a plurality of sub-carrier frequency bands, generates a plurality of segments having a frequency-time domain occupied by a predetermined number of sub-frequency bands and a predetermined number of time intervals, and classifies a plurality of segment types according to each of the segments, for data transmission. A mobile subscriber (MS) measures a channel state, extracts channel state information corresponding to the channel state, estimates a segment type using the extracted channel state information, and if there is a need for a change in the segment type, the MS transmits a segment type change request message to a base station (BS). Upon receiving a segment type change grant message from the BS, the MS receives data in a segment type corresponding to the received message.

62 Claims, 12 Drawing Sheets

SYSTEM AND METHOD FOR TRANSMITTING/RECEIVING DATA IN A MULTICARRIER COMMUNICATION SYSTEM

PRIORITY

This application claims the benefit under 35 U.S.C. §119 (a) of an application entitled "System and Method for Transmitting/Receiving Data in a Multicarrier Communication System" filed in the Korean Intellectual Property Office on Apr. 18, 2005 and assigned Serial No. 2005-32131, the entire contents of which are incorporated herein by reference.

BACKGROUND OF THE INVENTION

1. Field of the Invention

The present invention relates generally to a communication system using multiple carriers (a "multicarrier communication system"), and in particular, to a data transmission/reception system and method for applying differential signal combination schemes according to priority of data, for segment management.

2. Description of the Related Art

The $4^{th}$ generation (4G) communication system, which is the next generation communication system, aims at providing users with services having various Quality-of-Services (QoSs) at a data rate of about 100 Mbps.

To this end, in the 4G communication system, active research is being conducted on an Orthogonal Frequency Division Multiplexing (OFDM) scheme which is useful for high-speed data transmission over wire/wireless channels. The OFDM scheme, one of the schemes for transmitting data using multiple carriers, is a type of a Multi-Carrier Modulation (MCM) scheme that converts a serial input symbol stream into parallel symbols and modulates each of the symbols with a plurality of orthogonal sub-carriers, i.e., sub-carrier channels, before transmission.

Although the OFDM scheme is similar to the conventional Frequency Division Multiplexing (FDM) scheme, it is characterized by the following: obtaining optimal transmission efficiency during high-speed data transmission, maintaining orthogonality between multiple sub-carriers during transmission, and obtaining optimal transmission efficiency during high-speed data transmission due to its high frequency efficiency and its robustness against multipath fading. In addition, the OFDM scheme is regularly used for communication system architecture because it is robust against frequency selective fading, multipath fading and impulse noise, and can reduce Inter-Symbol Interference (ISI) using a guard interval and can design an equalizer in a simple hardware structure.

Generally, the OFDM scheme has high spectrum efficiency because spectrums between sub-carrier channels overlap each other, maintaining orthogonality there between. The OFDM scheme implements modulation by Inverse Fast Fourier Transform (IFFT), and demodulation by Fast Fourier Transform (FFT). A multiple access scheme based on the OFDM scheme includes an Orthogonal Frequency Division Multiple Access (OFDMA) scheme that allocates some of all sub-carriers to a particular mobile subscriber (MS). The OFDMA scheme does not need spreading sequences for spreading, and can dynamically change a set of sub-carriers allocated to a particular MS according to a fading characteristic of the wireless transmission path.

Therefore, development of the 4G communication system takes into account both the software aspect for developing various contents and the hardware aspect for developing a high-spectrum efficiency wireless access scheme to provide the highest QoS. Below is a general description of the hardware aspect taken into account in the 4G communication system.

In wireless communications, the high-speed, high-quality data service is generally affected by the channel environment. In the wireless communications, the channel environment is subject to frequent changes due to the Additive White Gaussian Noise (AWGN), as well as to power variation of received signals, caused by fading, shadowing, a Doppler effect caused by movement of an MS and a frequent change in moving velocity, and interference by the other MSs and multipath signals. Therefore, in order to provide high-speed wireless packet data service, there is a need for new advanced technology capable of adaptively coping with the channel variation in addition to the schemes provided in the conventional $2^{nd}$ generation (2G) or $3^{rd}$ generation (3G) communication system. Such schemes as an Adaptive Modulation and Coding (AMC) scheme and a Hybrid Automatic Retransmission Request (HARQ), used in the existing communication systems, also adaptively cope with the channel variation, contributing to dramatic improvement in the total system performance.

Notwithstanding the use of the AMC scheme and the HARQ scheme cannot solve the basic problem of lack of radio resources in wireless communications. Therefore, in order to maximize the subscriber capacity and enable the high-speed data transmission essential for multimedia service, there is a need for continued research of high-spectrum efficiency multiple access schemes.

With regards to high-speed, high-quality packet data service, there is a lively discussion on new multiple access schemes that have high spectrum efficiency and can guarantee priority of data. One of the new multiple access schemes is to differentiate transmission strategies in the communication systems, for data transmission, and as one of such communication systems, a Differential Segment System is now under discussion.

The Differential Segment System classifies types of segments and differentiates its transmission strategy according to a channel state and a type of data, for data transmission. The Differential Segment System classifies various segments and transmits data according to each segment type. Currently, there is no specific scheme proposed for setting segment types. Thus, there is a demand for a specific segment management scheme in a communication system that manages segments by applying a technology for coping with the channel variation using the segment type.

SUMMARY OF THE INVENTION

It is, therefore, an object of the present invention to provide a system and method for transmitting/receiving data according to segment management in a multicarrier communication system.

It is another object of the present invention to provide a system and method for setting a segment type according to a channel state and transmitting/receiving data using the segment type in a multicarrier communication system.

According to an aspect of the present invention, there is provided an operation method of a mobile subscriber (MS) for data exchange between the MS and a base station (BS) in a multicarrier communication system including the MS and the BS providing a service to the MS. The method includes dividing a full frequency band of the communication system into a plurality of sub-carrier frequency bands, generating a plurality of segments having a frequency domain and a time domain occupied by a predetermined number of sub-frequency bands and a predetermined number of time intervals, and classifying a plurality of segment types according to each of the segments, for data transmission; measuring a channel state and extracting channel state information corresponding to the channel state; estimating a segment type using the extracted channel state information, and determining whether there is a need for a change in a segment type currently allocated to the MS itself; if there is a need for a change in the segment type, transmitting a segment type change request message to the BS; and upon receiving a segment type change grant message from the BS in response to the segment type change request message, receiving data in a segment type corresponding to the received segment type change grant message.

According to still another aspect of the present invention, there is provided an operation method of a base station (BS) for data exchange between a mobile subscriber (MS) and the BS in a multicarrier communication system including the MS and the BS providing a service to the MS. The method includes dividing a full frequency band of the communication system into a plurality of sub-carrier frequency bands, generating a plurality of segments having a frequency domain and a time domain occupied by a predetermined number of sub-frequency bands and a predetermined number of time intervals, and classifying a plurality of segment types according to each of the segments, for data transmission; predicting a load state of each individual segment type using load prediction information, and receiving a segment type change request message; determining whether it is possible to change a segment type in response to the segment type change request; if it is possible to change a segment type, transmitting a segment type change grant message to the MS and transmitting data to the MS in the changed segment type; and if it is not possible to change a segment type, transmitting data in an existing segment type.

According to yet another aspect of the present invention, there is provided an operation method of a mobile subscriber (MS) for data exchange between the MS and a base station (BS) in a multicarrier communication system including the MS and the BS providing a service to the MS. The method includes dividing a full frequency band of the communication system into a plurality of sub-carrier frequency bands, generating a plurality of segments having a frequency domain and a time domain occupied by a predetermined number of sub-frequency bands and a predetermined number of time intervals, and classifying a plurality of segment types according to each of the segments, for data transmission; measuring a channel state and extracting channel state information corresponding to the channel state; and upon receiving a segment type change grant message from the BS after transmitting the extracted channel state information to the BS, receiving data in a segment type corresponding to the received segment type change grant message.

According to still yet another aspect of the present invention, there is provided an operation method of a base station (BS) for data exchange in a multicarrier communication system including a mobile subscriber (MS) and the BS providing a service to the MS. The method includes dividing a full frequency band of the communication system into a plurality of sub-carrier frequency bands, generating a plurality of segments having a frequency domain and a time domain occupied by a predetermined number of sub-frequency bands and a predetermined number of time intervals, and classifying a plurality of segment types according to each of the segments, for data transmission; predicting a load state of each individual segment type using load prediction information, and receiving channel state information; estimating a segment type using the channel state information to determine whether there is a need for a change in a segment type allocated to the MS; if there is a need for a change in the segment type, determining whether it is possible to change the segment type; if it is possible to change the segment type, transmitting a segment type change grant message to the MS and transmitting data to the MS in the changed segment type; and if it is not possible to change the segment type, transmitting data in an existing segment type.

According to still another aspect of the present invention, there is provided a data exchange system in a multicarrier communication system including a mobile subscriber (MS) and a base station (BS) providing a service to the MS. The data exchange system divides a full frequency band of the communication system into a plurality of sub-carrier frequency bands, generates a plurality of segments having a frequency domain and a time domain occupied by a predetermined number of sub-frequency bands and a predetermined number of time intervals, and classifies a plurality of segment types according to each of the segments, for data transmission. The MS includes a channel state information extractor for measuring a channel state and extracting channel state information corresponding to the channel state; a real-time segment type estimator for setting a realtime segment type using the extracted channel state information; a non-realtime segment type estimator for setting a non-realtime segment type using the channel state information; and a history manager for determining whether there is a need for a change in the segment types set in the realtime segment type estimator and the non-realtime segment type estimator, and transmitting a segment type change request message to the BS if there is a need for a change in the segment types.

According to yet still another aspect of the present invention, there is provided a data exchange system in a multicarrier communication system including a mobile subscriber (MS) and a base station (BS) providing a service to the MS. The data exchange system divides a full frequency band of the communication system into a plurality of sub-carrier frequency bands, generates a plurality of segments having a frequency domain and a time domain occupied by a predetermined number of sub-frequency bands and a predetermined number of time intervals, and classifies a plurality of segment types according to each of the segments, for data transmission. The BS includes a scheduler for classifying data to be transmitted to the MS into each segment type, and scheduling the data according to each segment type using a preset scheduling scheme; a type change manager for receiving a segment type change request message from the MS, predicting a load state of each individual segment type using load prediction information, determining whether it is possible to change a segment type in response to the segment type change request message, and transmitting a segment type change grant message to the MS if it is possible to change the segment type; a queue state manager for managing a queue state according to the segment type classification, and generating information on the queue state according to each segment type; and a resource map manager for receiving a segment type change command from the type change manager and managing a resource map so as to keep load balancing for each individual segment type.

According to further still another aspect of the present invention, there is provided a data exchange system in a multicarrier communication system including a mobile subscriber (MS) and a base station (BS) providing a service to the MS. The data exchange system divides a full frequency band of the communication system into a plurality of sub-carrier frequency bands, generates a plurality of segments having a frequency domain and a time domain occupied by a predetermined number of sub-frequency bands and a predetermined number of time intervals, and classifies a plurality of segment types according to each of the segments, for data transmission. The MS includes a channel state information extractor for measuring a channel state, extracting channel state information corresponding to the channel state, and transmitting the channel state information to the BS.

According to still another aspect of the present invention, there is provided a data exchange system in a multicarrier communication system including a mobile subscriber (MS) and a base station (BS) providing a service to the MS. The data exchange system divides a full frequency band of the communication system into a plurality of sub-carrier frequency bands, generates a plurality of segments having a frequency domain and a time domain occupied by a predetermined number of sub-frequency bands and a predetermined number of time intervals, and classifies a plurality of segment types according to each of the segments, for data transmission. The BS includes a non-realtime segment type estimator for receiving channel state information from the MS and setting a non-realtime segment type; a history manager for determining whether there is a need for a change in the segment types set in a realtime segment type estimator and the non-realtime segment type estimator; a scheduler for classifying data to be transmitted to the MS into each segment type, and scheduling the data according to each segment type using a preset scheduling scheme; a type change manager for predicting a load state of each individual segment type using load prediction information, and transmitting a segment type change grant message to the BS if the history manager determines that it is possible to change the segment type; a queue state manager for managing a queue state based on the segment type classification, and generating information on the queue state according to each segment type; and a resource map manager for receiving a segment type change command from the type change manager and managing a resource map so as to keep load balancing for each individual segment type.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail below with reference to the accompanying drawings. In the following description, a detailed description of known functions and configurations incorporated herein has been omitted for clarity and conciseness.

The present invention will be described herein with reference to a multicarrier communication system using a differential segment structure, For example, an Orthogonal Frequency Division Multiple Access (OFDMA) communication system.

A segment management method according to the present invention estimates a segment type taking into account such channel environments as a carrier-to-interference and noise ratio (CINR) of a mobile subscriber (MS), a correlation between antennas, a Doppler frequency (of moving velocity), and the number of reception antennas. Using the estimated segment type, a base station (BS) transmits data to an MS through a change in the segment type and a resource map.

Figure 1:
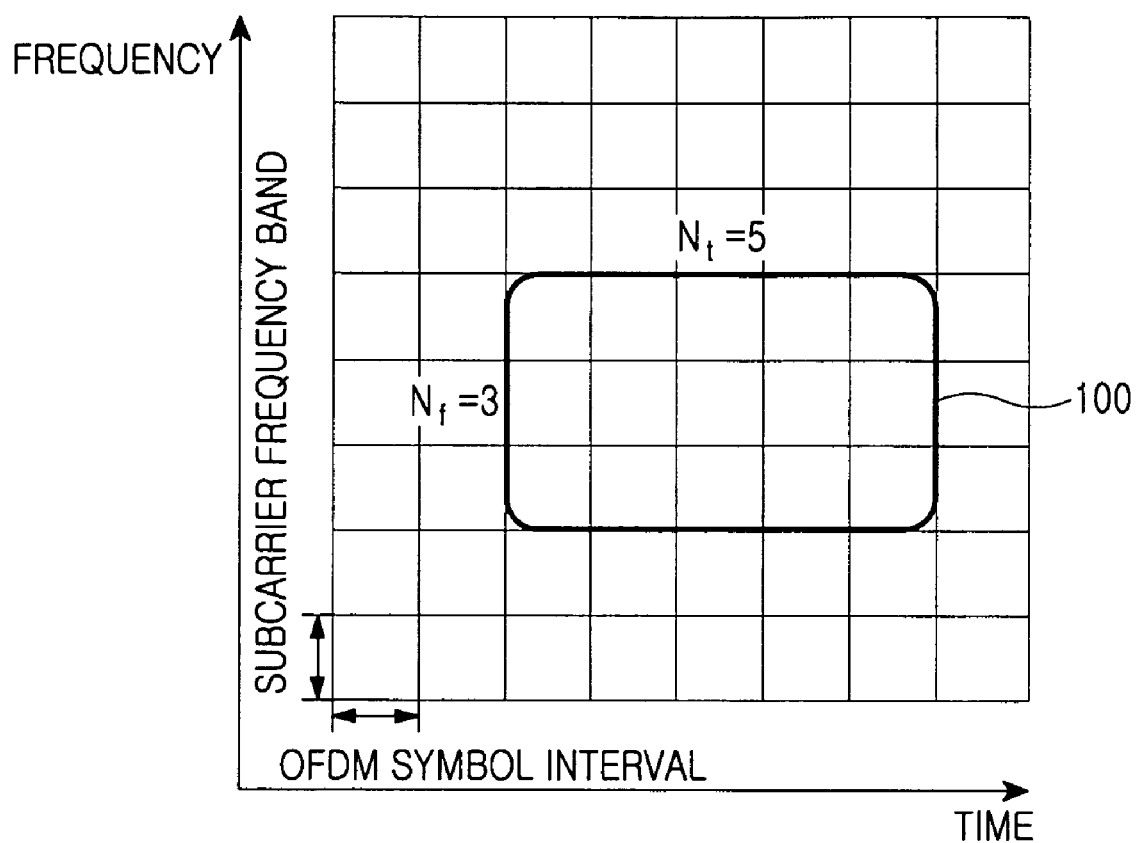
FIG. 1 is a diagram schematically illustrating segment allocation in an OFDMA communication system according to the present invention.

Herein, the present invention will be described with reference to a system using the differential segment structure, by way of example. However, the present invention can be applied to other communication systems that differentiate a transmission strategy according to the channel environment and the traffic type, for data transmission, like the Differential Segment System. With reference to FIG. 1, below is a description of a communication system with the differential segment structure.

FIG. 1 is a diagram schematically illustrating segment allocation in an OFDMA communication system according to the present invention. Referring to FIG. 1, the horizontal axis represents a time domain, and the vertical axis represents a frequency domain. The OFDMA communication system divides the full bandwidth into a plurality of sub-carrier frequency bands.

As illustrated in FIG. 1, a region which occupies a predetermined number ($N_t$) of OFDM symbol intervals in the time domain and a predetermined number ($N_f$) of sub-carrier frequency bands in the frequency domain will be defined as a 'segment'. Therefore, one segment can transmit $N_t \times N_f$ modulated OFDM symbols. As a result, the segment is a unit for transmitting one packet.

The number ($N_t$) of OFDM symbol intervals and the number ($N_f$) of sub-carrier frequency bands, constituting the segment, can be variably set according to the system environment of the OFDMA communication system. In conclusion, the OFDMA communication system has a plurality of segments in a preset time interval.

The segment allocation in the OFDMA communication system according to the present invention has been described so far with reference to FIG. 1. Next, with reference to FIG. 2, below is a description of segment types supported in an OFDMA communication system.

Figure 2:
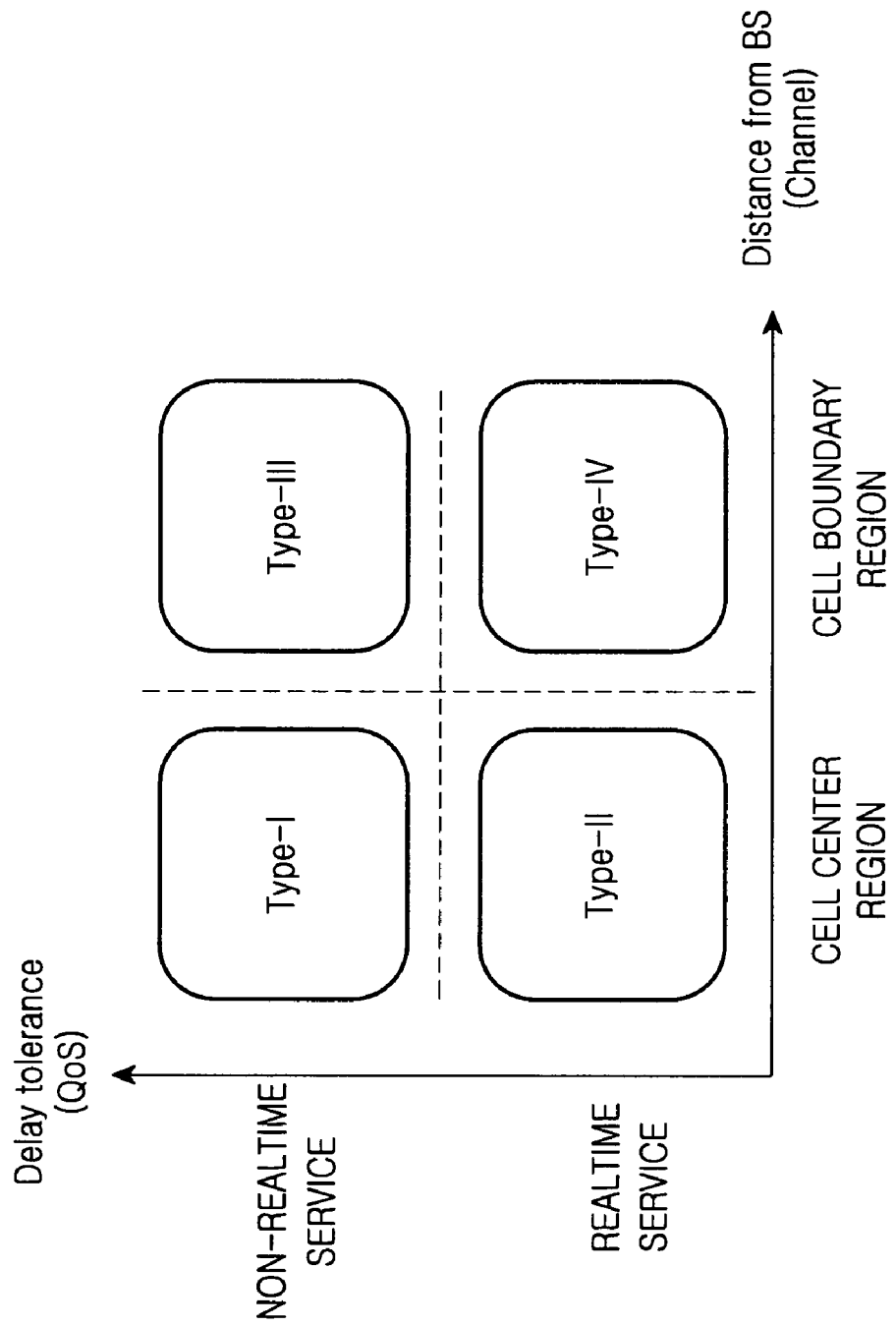
FIG. 2 is a diagram schematically illustrating segment types supported in an OFDMA communication system according to the present invention.

FIG. 2 is a diagram schematically illustrating segment types supported in an OFDMA communication system according to the present invention.

Referring to FIG. 2, a differential segment structure is realized by differentiating a signal processing scheme applied to the segment according to priority. Herein, the priority is generated taking into account a delay tolerance condition, i.e., a QoS level condition, and a distance-from-BS condition, i.e., a channel quality condition. The QoS level condition is a condition used for determining whether a corresponding service is a Real Time (RT) service or a Non Real Time (NRT) service, and the channel quality condition is a condition used for determining whether a corresponding region is a cell center region or a cell boundary region. The cell center and cell boundary regions do not simply mean the absolute distance from a BS, and are defined taking into account such channel information as an average CINR, a correlation between antennas, and a Doppler distance in a complex way.

Segments are classified into four types according to the priority ranging from Type I to Type IV. Herein, the four segment types are classified taking into account the delay tolerance condition and the distance from a BS such that a first type is a Non Realtime Center (NRC) segment type, a second type is a Realtime Center (RC) segment type, a third type is a Non Realtime Boundary (NRB) segment type, and a fourth type is a Realtime Boundary (RB) segment type.

Figure 3:
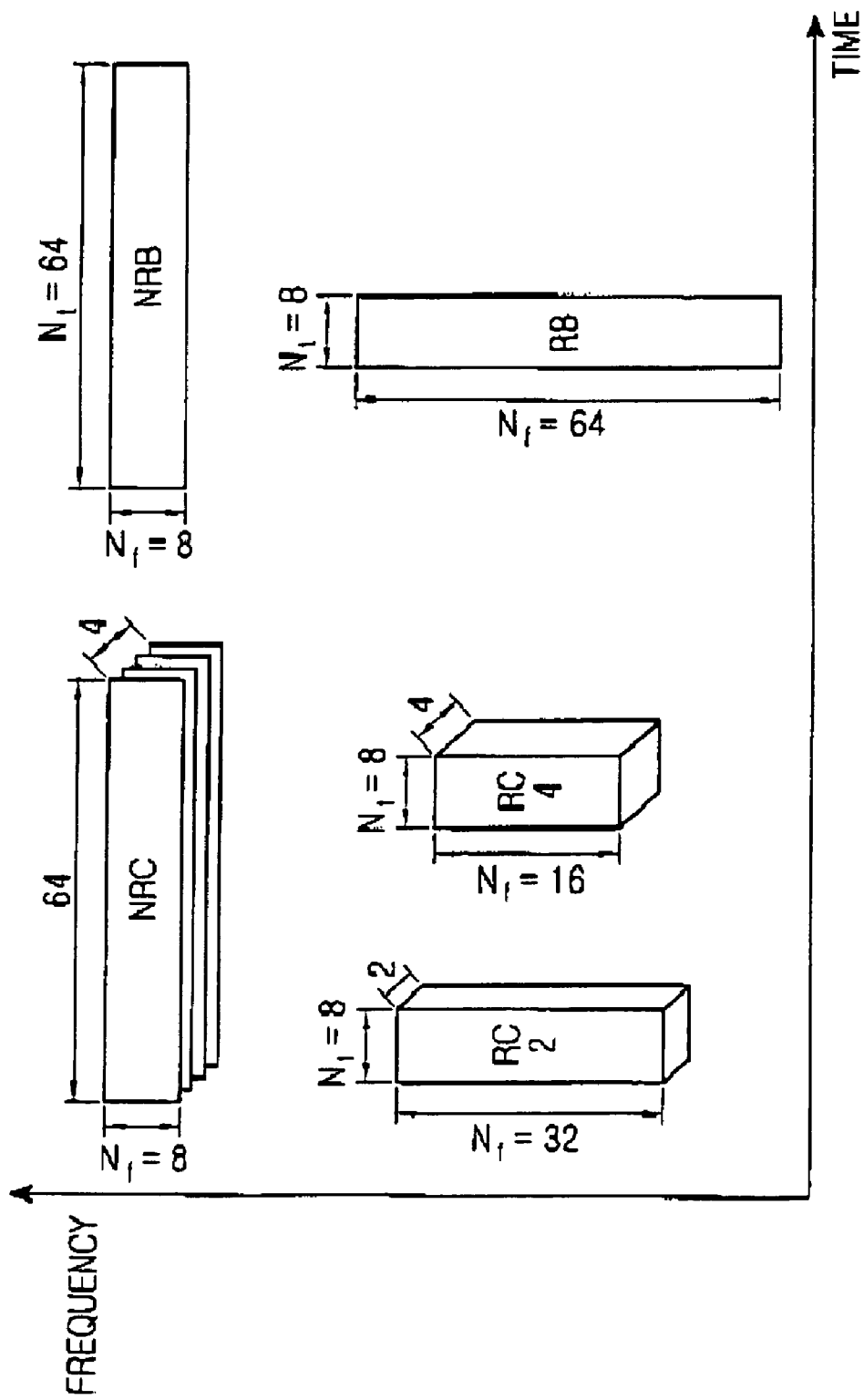
FIG. 3 is a diagram schematically illustrating a segment structure supported in an OFDMA communication system with 2 or more transmission antennas according to the present invention.

Next, with reference to FIG. 3, below is a description of a segment structure based on the differential segment types. FIG. 3 is a diagram schematically illustrating a segment structure supported in an OFDMA communication system with at least four transmission antennas according to the present invention.

Referring to FIG. 3, there are illustrated segment types based on the differential segment structure. In FIG. 3, the vertical axis represents a frequency domain and the horizontal axis represents a time domain. The RC segment type, the RB segment type, the NRC segment type, and the NRB segment type are illustrated, by way of example.

The NRT segment types, i.e., the NRC segment type and the NRB segment type, have a size of $N_t=64$ and $N_f=8$. Herein, $N_t$ represents 64 OFDM symbol transmission intervals in the time domain, and $N_f$ represents 8 sub-carriers in the frequency domain. However, as to the Real Time (RT) segment types, i.e., the RC segment type and the RB segment type, $N_t$ is 8 ($N_t=8$) and $N_f$ is 64 ($N_f=64$) for the RB segment type and is 32 and 16 ($N_f=32/16$) for the RC segment type.

The NRC segment type and the RC segment type are the channels allocated to the users located in the cell center, i.e., the users having an excellent channel environment. Therefore, they can obtain high spectral efficiency through a spatial multiplexing-based parallel transmission technique.

The NRC segment type, as it uses an opportunistic scheduling technique, allocates respective spatial channels to different users to maximize multiuser diversity. However, the RC segment type allocates all spatial channels to one user for stable transmission, thereby maximizing spatial diversity. Further, the RC segment type has 2 or 4 spatial channels in a spatial axis, and the number of the spatial channels depends upon the number of channels multiplexed in the spatial axis. Since all of the spatial channels are allocated to one user, a shape of the segment is changed according to the number of the spatial channels, in order to provide the same number of symbols per segment type.

Therefore, when a Double-Space Time Transmit Diversity (Double-STTD) technique, one of multiantenna transmission techniques, is applied to the BS, there are provided two spatial layers. In this case, the RC segment type has a value of $N_f=32$, like the RC-2 segment shown in FIG. 3. However, when a Vertical-Bell Laboratory Layered Space-Time (V-Blast) technique, one of the multiantenna transmission techniques, is applied to the BS, there are provided four (4) spatial layers, i.e., spatial channels. In this case, the RC segment type has a value of $N_f=16$, like the RC-4 segment shown in FIG. 3.

The segments based on the differential segment structure of FIG. 3 can actually have different sizes and shapes, providing a two-dimensional map structure of the time domain and the frequency domain. Since MSs mapped to the segment types and distribution of traffic, i.e., user data, can be changed according to the conditions of the OFDMA communication system, a structure of the resource map based on the differential segment structure is not limited to the forms and sizes shown in FIG. 3, and can be freely changed to the other forms. However, the form of the resource map structure should be changed to a form for maximizing transmission efficiency of the OFDMA communication system. Alternatively, it is possible to design different resource map structures between neighbor cells in order to minimize Inter-Cell Interference (ICI).

Thus far, the segment structure supported in the OFDMA communication system has been described with reference to FIG. 3. Next, with reference to FIG. 4, below is a description of a frame structure of an OFDMA communication system.

Figure 4:
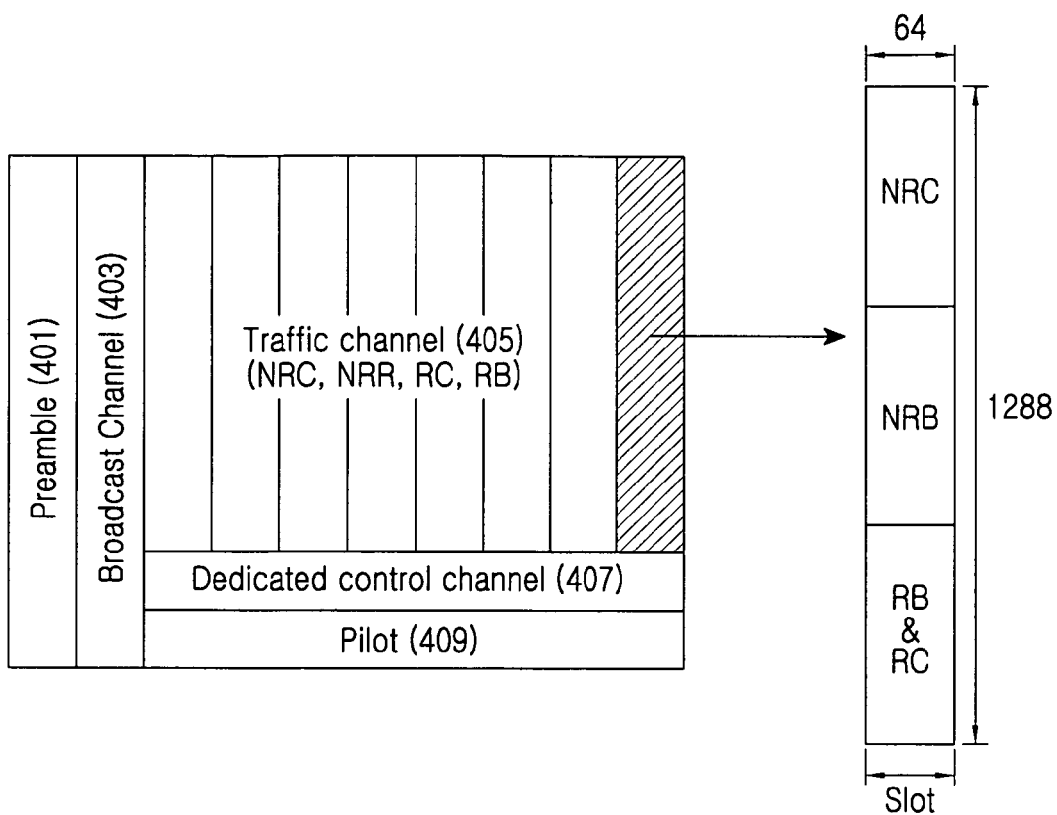
FIG. 4 is a diagram schematically illustrating a frame structure of an OFDMA communication system according to the present invention.

FIG. 4 is a diagram schematically illustrating a frame structure of an OFDMA communication system according to the present invention. Referring to FIG. 4, the frame includes a preamble 401, a broadcast channel 403, a traffic channel 405, a dedicated control channel 407, and a pilot channel 409.

Shown is a structure of a frame applied to an uplink, and a description of the structure will now be given. The preamble 401 is located in a first part of the frame, and performs a function for synchronization and cell search. The broadcast channel 403 includes cell information and paging information. The dedicated control channel 407 includes therein a traffic control channel (TCCH) indicating the downlink/uplink scheduling results and a signaling for supporting opportunistic transmission. The pilot channel 409 is used for performing fine synchronization and coherent demodulation as well as performing channel state estimation for application of a data rate. The pilot channel 409 is used for synchronization with an MS. The traffic channel 405 is divided into channels for performing transmission for individual user data, i.e., the individual segment types (RC, RB, NRC, and NRB).

In the fame structure, there are shown structures of traffic channels transmitted according to each segment type, by way of example. Although a resource map of a frame for the NRC segment and the NRB segment is separated, the NRT segment performs feedback on an instantaneous channel state based on the opportunistic scheduling technique. Therefore, because the instantaneous channel state is received, it is necessary to separate the NRC segment region from the NRB segment region. However, the RT segments, i.e., the RC segment region and the RB segment are transmitted without regional separation because there is no feedback information due to the opportunistic scheduling technique.

If one cluster is defined as a 64*56 grid, i.e., 64 OFDM symbol transmission intervals in the time axis and 56 sub-carriers in the frequency domain, the cluster can have 8 NRT segments or RT segments for the case where the spatial multiplexing is not taken into consideration. Therefore, assuming that the total number of sub-carriers of the traffic channel is 1288, the cluster is divided for each individual segment type according to a ratio of the NRT data to the RT data because there are 23 clusters for a 64-OFDM symbol transmission time. A detailed description will now be made of a process for allocating the respective segments to a frame.

The structure of the frame based on the segments in the OFDMA communication system has been described so far with reference to FIG. 4. Next, with reference to FIG. 5, a description will be made of a structure of an MS according to the present invention.

Figure 5:
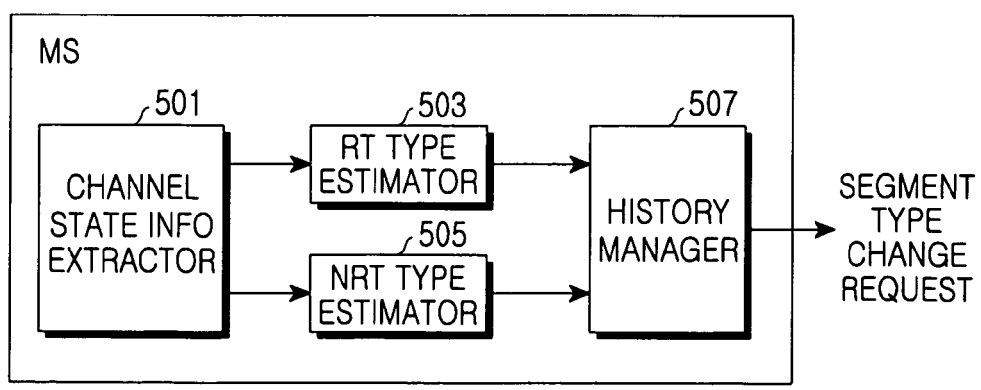
FIG. 5 is a diagram schematically illustrating a structure of an MS for an OFDMA communication system according to the present invention.

FIG. 5 is a diagram schematically illustrating a structure of an MS for an OFDMA communication system according to the present invention. Referring to FIG. 5, the MS includes a channel state information extractor 501, an RT type estimator 503, an NRT type estimator 505, and a history manager 507.

Information on the channel state is needed in order to set the segment type according to the channel state. The channel state information for setting the segment type can include, for example, an average CINR, an antenna correlation, a Doppler frequency, and the number of reception antennas.

When the average CINR in the channel state information is high, a corresponding region is classified as a cell center, in which a data rate is increased using a Spatial Division Multiplexing (SDM) technique. However, when the average CINR is low, the corresponding region is classified as a cell boundary, in which reception performance is increased. When the antenna correlation is low, the corresponding region is classified as the cell center because transmission using multiple parallel channels is possible. However, when the antenna correlation is high, the corresponding region is classified as the cell boundary because the transmission using multiple parallel channels is difficult. In addition, when the Doppler frequency (i.e., moving velocity) is low, the corresponding region is classified as the cell center because interference control is easy between spatial multiplexed signals. However, when the Doppler frequency is high, the corresponding region is classified as the cell boundary because interference control is difficult between spatial multiplexed signals. Further, the number of antennas, i.e., the number of reception antennas of an MS, is also used as information for classifying the corresponding region as the cell center or the cell boundary because it affects reception performance.

Therefore, the channel state information extractor 501 extracts the average CINR, the antenna correlation and the Doppler frequency in order to estimate the channel state information. However, because the number of reception antennas of the MS is fixed, the channel state information extractor 501 previously stores therein information on the number of the antennas.

Each segment type is classified as the RT segment type or the NRT segment type using the channel state information before being estimated. Therefore, the channel state information is input to the RT type estimator 503 and the NRT type estimator 505.

The RT type estimator 503 determines each type by comparing the channel state information with specific reference values that are predetermined using the channel state information. Therefore, the RT type estimator 503 estimates the RT segment type. As a result, the RT segment type is classified into an RB segment, an RC-2 segment, and an RC-4 segment when the number of transmission antennas is greater than or equal to four (4).

Similarly, the NRT type estimator 505 estimates the NRT segment type using the channel state information. The NRT type estimator 505 determines each type by comparing the channel state information with specific reference values that are predetermined using the channel state information. As a result, the NRT segment type is classified into an NRC segment and an NRB segment. Operations of the RT type estimator 503 and the NRT type estimator 505 will be described in detail later.

The RT segment type and the NRT segment type estimated by the RT type estimator 503 and the NRT type estimator 505 are input to the history manager 507, and the history manager 507 integrates the segment type estimation results for a predetermined time. If it is determined that it is efficient to receive data from a BS through a segment changed from the estimated segment type after a lapse of a preset time, the history manager 507 generates a segment type change request message and transmits the segment type change request message to the BS. The history manager 507 determines to change the segment type after a lapse of the predetermined time to prevent a ping-pong phenomenon in which the RT segment types are too frequently changed.

The structure of the MS according to the present invention has been described so far with reference to FIG. 5. Next, with reference to FIGS. 6 and 7, below is a description of operations of the RT type estimator and the NRT type estimator.

Figure 6:
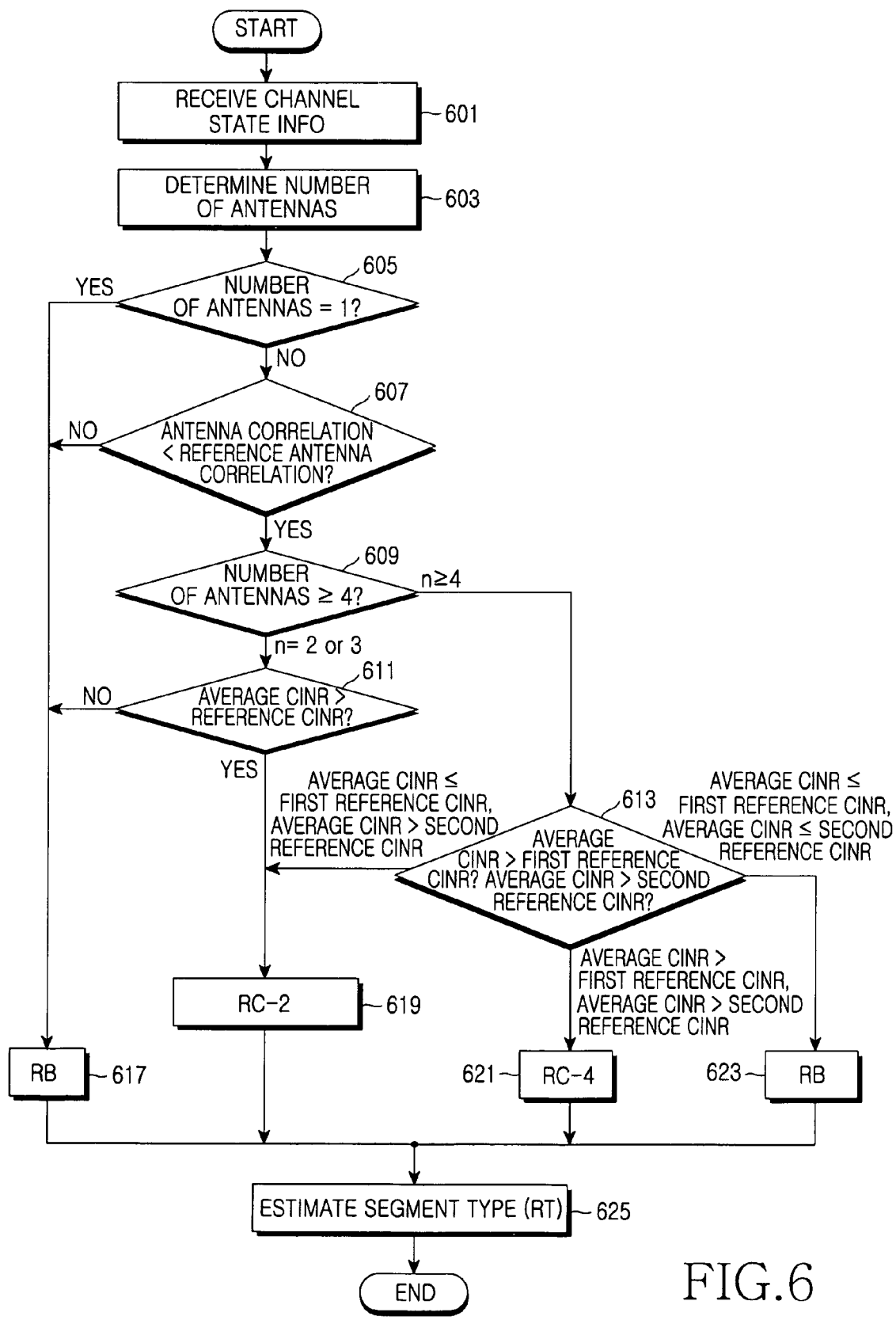
FIG. 6 is a flowchart schematically illustrating an RT segment type estimation process in an OFDMA communication system according to the present invention.

FIG. 6 is a flowchart schematically illustrating an RT segment type estimation process in an OFDMA communication system according to the present invention.

Referring to FIG. 6, there is shown an operation of an RT type estimator. In step 601, the RT type estimator receives channel state information of an MS, extracted by a channel state estimator, including information regarding an average CINR, an antenna correlation, a Doppler frequency and the number of antennas. In step 603, the RT type estimator determines the number of antennas.

The RT type estimator determines in step 605 whether the number of antennas of the MS is 1. If it is determined that the number of antennas is 1, the RT type estimator proceeds to step 617, and if the number of reception antennas is more than 1, the RT type estimator proceeds to step 607.

In step 617, the RT type estimator sets a type of the RT segment as an RB segment. If it is determined in step 605 that there is 1 antenna, an SDM scheme cannot be used even in an excellent channel environment, so the RT type estimator always sets the RT segment type as the RB segment type. However, if the number of reception antennas is greater than or equal to 2, a Double-Space Time Transmit Diversity (Double-STTD) technique, a Space Time Block Code (STBC) technique and a Bell Laboratory Layered Space-Time (Blast) technique can be used, and because this is better than a reference CINR, each segment type is distinguished on the basis of an antenna correlation and an average CINR.

In step 607, the RT type estimator determines whether the antenna correlation of the MS is lower than a preset reference antenna correlation. If it is determined that the antenna correlation is lower than a preset reference antenna correlation, the RT type estimator proceeds to step 617. However, if the antenna correlation is greater than or equal to a preset reference antenna correlation, the RT type estimator proceeds to step 609.

In step 609, the RT type estimator determines whether the number of antennas of the MS is at least 4. If it is determined that the number of antennas is at least 4, the RT type estimator proceeds to step 613. However, if the number of antennas is less than 4, the RT type estimator proceeds to step 611.

In step 611, the RT type estimator determines whether an average CINR is greater than a preset reference CINR. If it is determined that the average CINR is less than the reference CINR, the RT type estimator proceeds to step 617. However, if the average CINR is greater than the reference CINR, the RT type estimator proceeds to step 619. In step 619, the RT type estimator sets a type of the RT segment as an RC-2 segment and then proceeds to step 625.

In step 613, the RT type estimator determines whether the average CINR of the MS is greater than a preset first reference CINR (High) and second reference CINR (Low). If it is determined that the average CINR is greater than both of the two reference CINRs, the RT type estimator proceeds to step 621. If the average CINR is lower than or equal to the first reference CINR and greater than the second reference CINR, the RT type estimator proceeds to step 619. If the average CINR is less than or equal to both reference CINRs, the RT type estimator proceeds to step 623.

In step 621, the RT type estimator sets a type of the RT segment as an RC-4 segment and then proceeds to step 625. In step 623, the RT type estimator sets the RT segment type as the RB segment type and then proceeds to step 625.

In step 625, the RT type estimator estimates a segment type according to the set RT segment type. Therefore, the RT type estimator receives the channel state information and estimates the segment type through the foregoing process using the channel state information. As a result, the RT type estimator can distinguish the RB segment type for the case where the number of antennas of the MS is 1; the RB segment type or the RC-2 segment type for the case where the number of antennas is two (2) or three (3); and the RB segment type, the RC-2 segment type and the RC-4 segment type for the case where the number of antennas is at least four (4). Herein, the RC-2 segment type or the RC-4 segment type is an RC segment whose spatial channels are extended as the number of antennas is increased, and the RT type estimator adaptively sets the RC segment type according to the number of antennas. The segment type is determined herein depending on the number of antennas, by way of example, but it is not limited to a structure of the segment.

Figure 7:
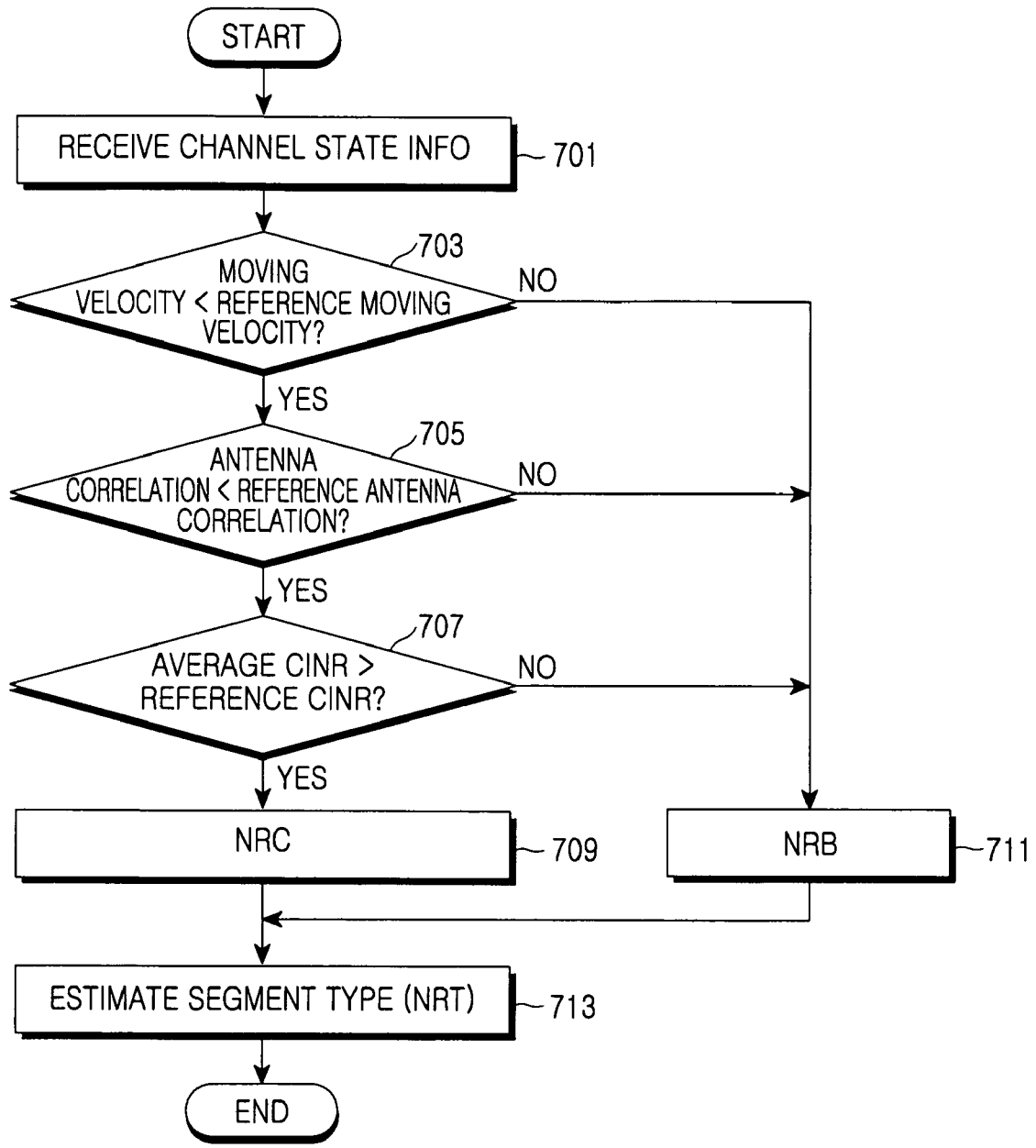
FIG. 7 is a flowchart schematically illustrating an NRT segment type estimation process in an OFDMA communication system according to the present invention.

FIG. 7 is a flowchart schematically illustrating an NRT segment type estimation process in an OFDMA communication system according to the present invention. Referring to FIG. 7, there is shown an operation of an NRT type estimator. In step 701, the NRT type estimator receives channel state information extracted by a channel state estimator, including information on an average CINR of an MS, an antenna correlation, a Doppler frequency (moving velocity) and the number of antennas.

The NRT type estimator determines in step 703 whether the moving velocity of the MS is less than a preset reference moving velocity. If it is determined that the moving velocity of the MS is at least the reference moving velocity, the NRT type estimator proceeds to step 711. However, if the moving velocity of the MS is less than the reference moving velocity, the NRT type estimator proceeds to step 705. In step 711, the NRT type estimator sets an NRT segment type as an NRB segment type and then proceeds to step 713.

In step 705, the NRT type estimator determines whether the antenna correlation of the MS is less than a preset reference antenna correlation. If it is determined that the antenna correlation is at least the reference antenna correlation, the NRT type estimator proceeds to step 711. However, if the antenna correlation is less than the reference antenna correlation, the NRT type estimator proceeds to step 707.

In step 707, the NRT type estimator determines whether the average CINR is greater than a preset reference CINR. If it is determined that the average CINR is greater than a preset reference CINR, the NRT estimator proceeds to step 709. However, if the average CINR is less than or equal to the reference CINR, the NRT estimator proceeds to step 711.

In step 709, the NRT type estimator sets the NRT segment type as an NRC segment type. In step 713, the NRT type estimator estimates a segment type according to the set NRT segment type. Similarly, the NRT type estimator, like the RT type estimator, receives the channel state information and estimates the segment type using the channel state information.

However, the NRT type estimator is different from the RT type estimator in that the moving velocity of the MS is important in the NRT type estimator.

The NRC segment type is used in an excellent channel environment, and uses a transmission technique that uses opportunistic transmission-based multiple beams depending on accurate channel estimated value because the NRC segment type can predict an accurate CINR because of its low influence of or variation in interference. However, at the high moving velocity of the user, reception performance of channel feedback information is deteriorated. Therefore, the high moving velocity of the user is inappropriate for the use of the NRC segment type, so the moving velocity of the MS is a decisive factor used for estimating the NRT segment type.

FIGS. 6 and 7 have illustrated the segment type estimation process for each individual segment type. The predetermined reference antenna correlation, reference CINR, first reference CINR, and second reference CINR used for the segment type estimation are not limited to specific values because they have variable values according to system conditions or characteristics.

Next, with reference to FIG. 8, below is a description of a structure of a BS that transmits data to the MS using a differential segment structure.

Figure 8:
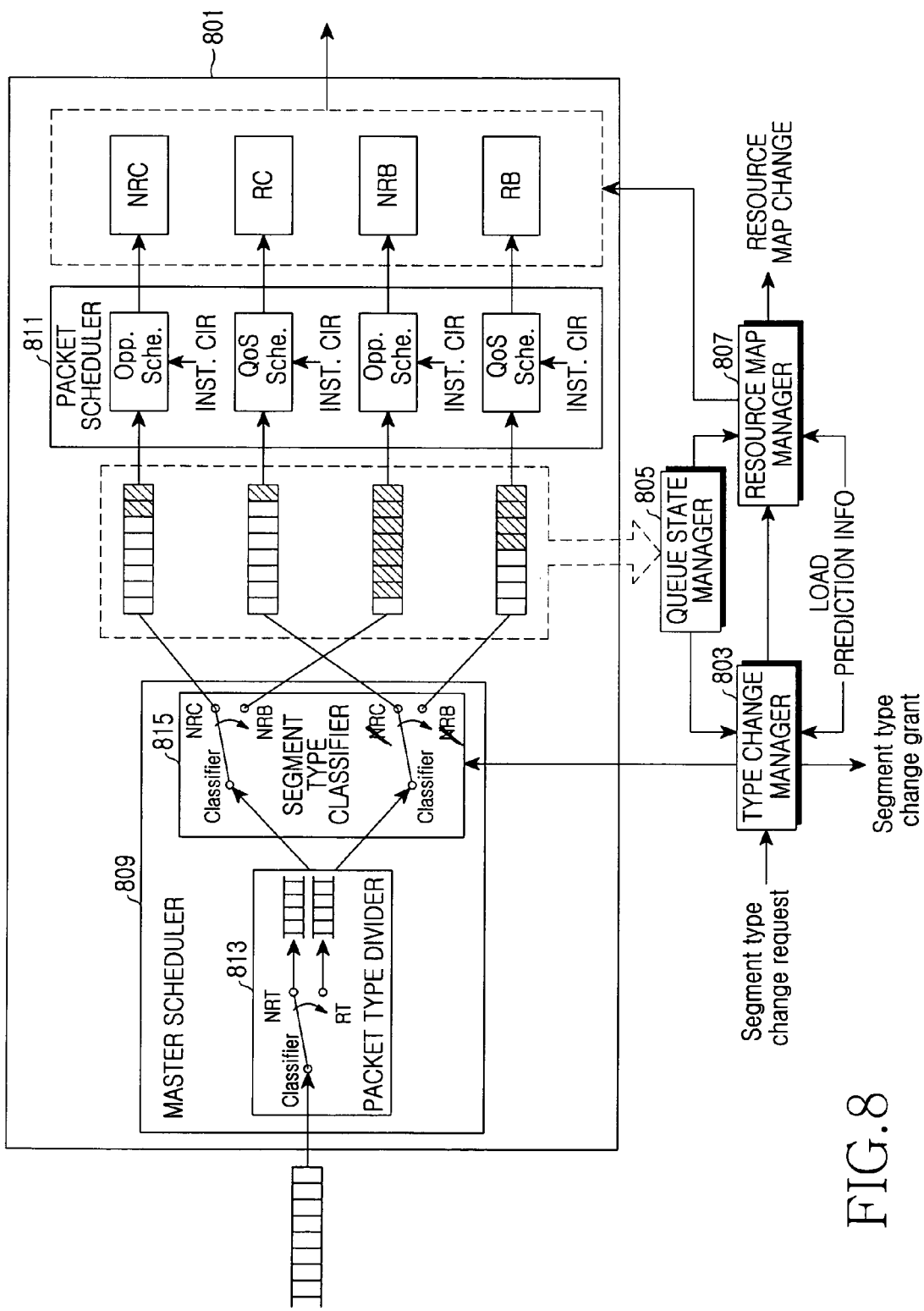
FIG. 8 is a diagram schematically illustrating a structure of a BS in an OFDMA communication system according to the present invention.

FIG. 8 is a diagram schematically illustrating a structure of a BS in an OFDMA communication system according to the present invention. Referring to FIG. 8, the BS includes a scheduler 801, a type change manager 803, a queue state manager 805, and a resource map manager 807.

The type change manager 803 loads load prediction information, i.e., acceptance control information (information for enabling prediction of a future load state). Next, the type change manager 803 predicts a load state of each individual segment type using load prediction information of each individual segment type and a current queue state of each individual segment. In this case, the type change manager 803 predicts a prediction load ratio Ld of a desired target segment type and a prediction load ratio Ls of the current segment type. The type change manager 803 predicts a load state of each individual segment type and determines whether to change the segment using the load prediction information.

The scheduler 801 includes therein a master scheduler 809 and a packet scheduler 811. The master scheduler 809 includes therein a packet type divider 813 and a segment type classifier 815.

The scheduler 801 classifies the packets (or data) input from the packet type divider 813 of the master scheduler 809 into RT segments and NRT segments according to their types.

The type change manager 803 of the BS receives a segment type change request message from an MS. The segment type change request is made by the MS by estimating a type of the segment using channel state information and transmitting a segment type change request message to the BS. In response to the segment type change request from MS, the type change manager 803 determines whether to change the segment type and transmits a segment type change grant message to the segment type classifier 815 according to the determination result.

Below is a description of a method in which the type change manager 803 determines whether to change the segment type. The type change manager 803 changes a segment type of the data to be transmitted to the MS if a difference between the prediction load ratio Ld of the desired target segment type and the prediction load ratio Ls of the current segment type is less than a priority P(k) of a $k^{th}$ MS (MS#k). However, if the difference between the prediction load ratio Ld of the desired target segment type and the prediction load ratio Ls of the current segment type is at least to the priority P(k) of the $k^{th}$ MS, the type change manager 803 holds the current state, i.e., maintains the current segment type.

Upon receiving a segment type change command from the type change manager 803, the segment type classifier 815 classifies the segment types desired by the BS to be transmitted to a corresponding MS into the NRC segment type, the NRB segment type, the RC segment type, and the RB segment type by controlling the scheduler 801. As a result, the resource map manager 807 manages the resource map according to each segment type so as to keep the load balancing, and appropriately changes the resource map according to each segment type.

In this case, the type change manager 803 can determine both the segment type change grant taking into account only the load prediction information and also the current load state. According tithe present invention, the segment type classifier 815 of the scheduler 801 classifies the segment types in response to the segment type change command from the type change manager 803.

After determining whether to change the segment type, the type change manager 803 transmits a message indicating the change in the segment type to the MS using a Medium Access Control (MAC) control message of the downlink. After receiving the segment type change grant message indicating the grant of the change in the segment type, the MS will receive messages in the changed segment type for the next data.

The queue state manager 805 manages states of the queues output from the master scheduler 809, generates information on the queue states according to the segment type, and transmits the queue state information to the type change manager 803 and the resource map manager 805.

The packet scheduler 811 receives packets according to each segment type, and performs opportunistic scheduling on the NRC segments and the NRB segments, and QoS scheduling on the RC segments and the RB segments. The resource map manager 807 is aware of the states of the queues corresponding to the segment types, and manages the resource map in such a manner that it changes the resource map if a difference between a buffer occupancy ratio Lmax in the queue for the segment type with the maximum load and a buffer occupancy ratio Lmin in the queue for the segment type when the minimum load exceeds a threshold $T_L$.

If the data is concentrated in the segment type desired by the MS, the type change manager 803 determines whether to change the segment type depending on the priority of the MS and the load prediction information, and transmits a message indicating the change in the segment type to the MS. Therefore, if the MS fails to receive the segment type change grant message from the BS in response to the segment type change request message transmitted by the MS, the MS receives data in the existing segment type.

The structure of the BS in the OFDMA communication system has been described so far with reference to FIG. 8. Next, with reference to FIG. 9, a description will be made of an operation of an MS in an OFDMA communication system according to the present invention.

Figure 9:
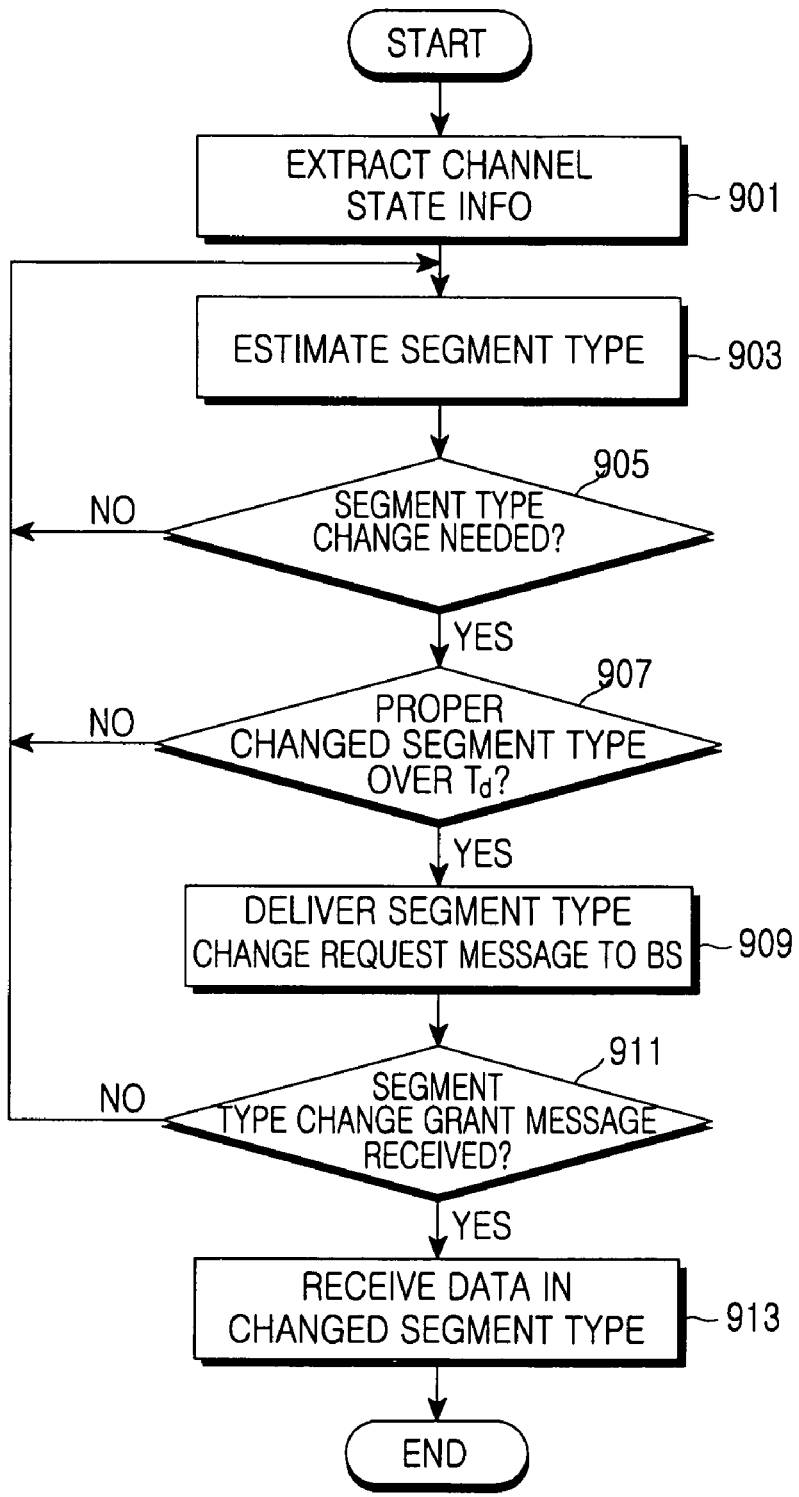
FIG. 9 is a flowchart schematically illustrating an operation of an MS in an OFDMA communication system according to the present invention.

FIG. 9 is a flowchart schematically illustrating an operation of an MS in an OFDMA communication system according to the present invention.

Referring to FIG. 9, in step 901, the MS estimates its channel state, and extracts the channel state information thereof, i.e., an average CINR, antenna correlation, a moving velocity, and the number of antennas. In step 903, the MS estimates a segment type using the channel state information and then proceeds to step 905. The segment type estimation process of the MS has been described separately for the RT segment type and the NRT segment type with reference to FIGS. 6 and 7.

In step 905, the MS determines whether there is a need for a change in the segment type currently allocated thereto. If it is determined that there is no need for the change in the segment type, the MS proceeds to step 903. However, if there is a need for the change in the segment type, the MS proceeds to step 907.

In step 907, the MS determines whether it is proper to use the changed segment type over a predetermined time Td. If it is determined that it is improper to use the changed segment type over the predetermined time Td, the MS proceeds to step 903. However, if it is proper to use the changed segment type over the predetermined time Td, the MS proceeds to step 909. In step 909, the MS transmits a segment type change request message to a BS, and then proceeds to step 911.

In step 911, the MS determines whether it has received a segment type change grant message from the BS in response to the segment type change request message. If it is determined that the MS fails to receive the segment type change grant message from the BS, the MS proceeds to step 903. However, upon receipt of the segment type change grant message from the BS, the MS proceeds to step 913. In step 913, the MS receives data from the BS in the changed segment type.

The operation of an MS in the OFDMA communication system according tithe present invention has been described below with reference to FIG. 9. Next, with reference to FIG. 10, a description will be made of an operation of a BS in an OFDMA communication system according to the present invention.

Figure 10:
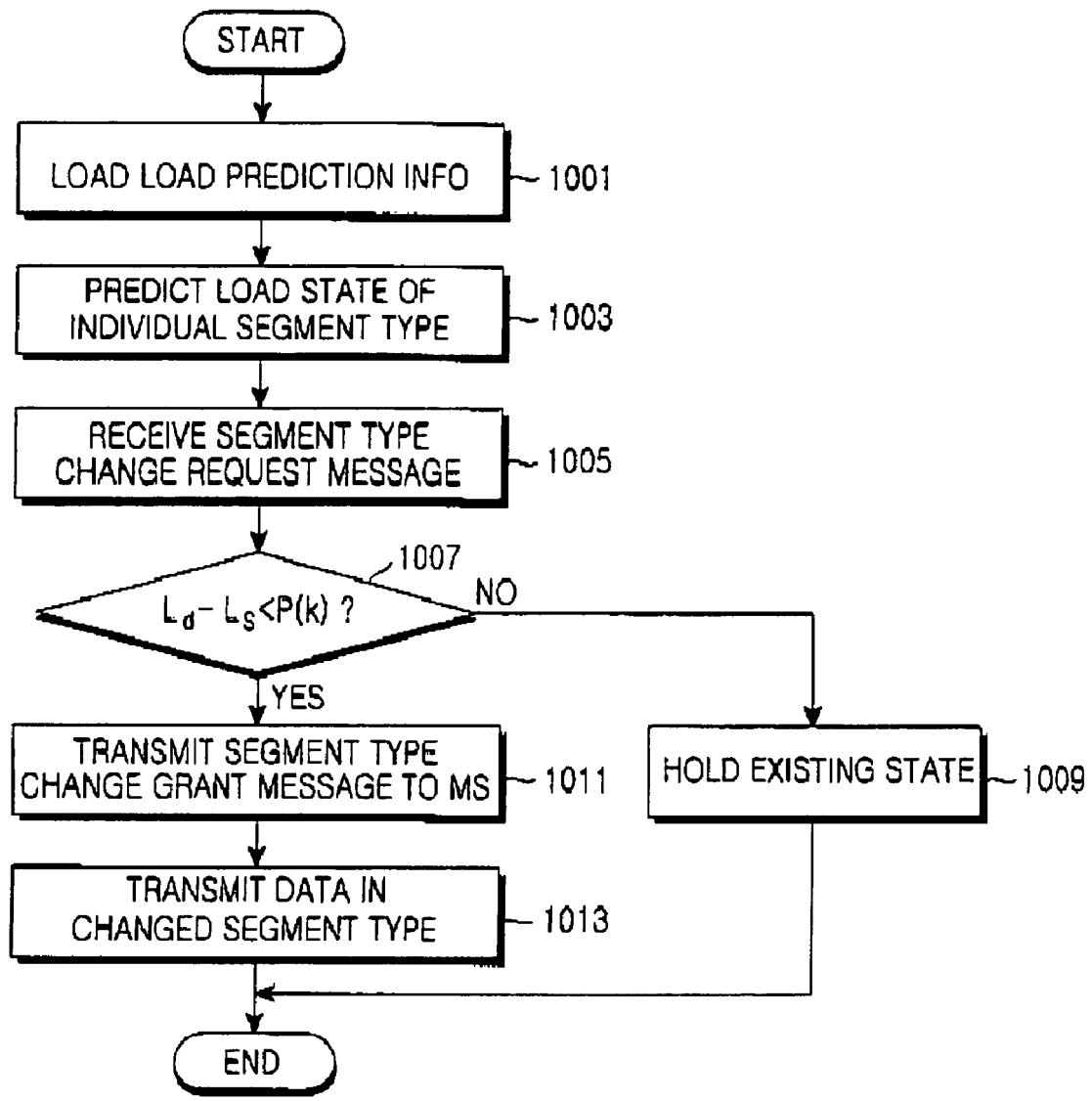
FIG. 10 is a flowchart schematically illustrating an operation of a BS in an OFDMA communication system according to the present invention.

FIG. 10 is a flowchart schematically illustrating an operation of a BS in an OFDMA communication system according to the present invention.

Referring to FIG. 10, in step 1001, the BS loads load prediction information, i.e., acceptance control information. In step 1003, the BS predicts a load state of each individual segment type. In other words, the BS predicts a prediction load ratio Ld of a desired target segment type and a prediction load ratio Ls of the current segment type.

In step 1005, the BS receives a segment type change request message from the MS. The BS determines in step 1007 whether a difference between the prediction load ratio Ld of the desired target segment type and the prediction load ratio Ls of the current segment type is less than a priority P(k) of the corresponding MS#k. If it is determined that the difference between the prediction load ratio Ld of the desired target segment type and the prediction load ratio Ls of the current segment type is lower than the priority P(k) of the MS#k, the BS proceeds to step 1011. However, if the difference between the prediction load ratio Ld of the desired target segment type and the prediction load ratio Ls of the current segment type is not lower than the priority P(k) of the MS#k, the BS proceeds to step 1009.

In step 1009, the BS holds the existing state, i.e., maintains the existing segment type. As a result, the BS transmits a message indicating no change in the existing segment type to the MS. Alternatively; the BS may transmit no separate message to the MS.

In step 1011, the BS transmits a segment type change grant message to the MS. In step 1013, the BS changes the segment and transmits data with the changed segment.

Although not separately illustrated, the BS can change each of the segment types taking into account not only the load prediction information, but also the current load state.

The operation between the BS and the MS in the OFDMA communication system according to the present invention has been described with references FIGS. 9 and 10. When the MS is the operation subject of classifying segment types as it estimates the segment types, the BS and the MS perform communication through the foregoing segment management. If the channel state is changed to be appropriate for a particular segment type, the MS sends a segment type change request to the BS.

Since the MS performs the segment type estimation, there is no need to periodically feed back the channel state information, i.e., average CINR, antenna correlation, and moving velocity, to the BS. If there is a need to change the segment type due to a change in channel environment or channel state, the MS can simply transmit only the segment type change request message to the BS, reducing the amount of feedback signal that should be transmitted to the BS.

When the MS attempts initial access to the BS, the MS estimates an appropriate channel type for the segment type at the initial access and transmits the estimation result to the BS. In this case, the BS transmits a grant message to the MS using the load prediction information and the load state. However, if the MS does not transmit the initial state message, the BS determines a segment message appropriate for each MS and transmits the determined segment type information.

Figure 11:
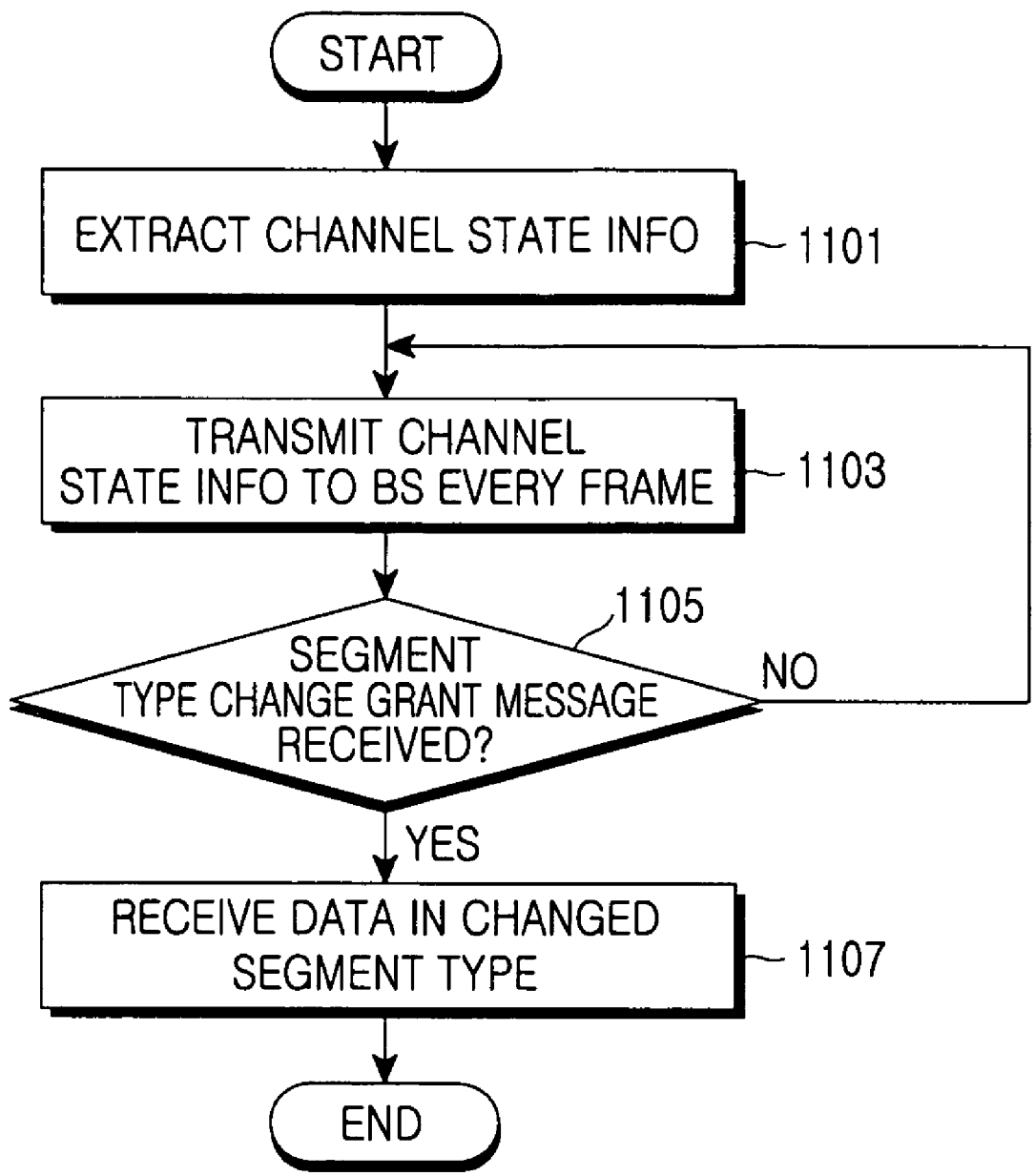
FIG. 11 is a flowchart schematically illustrating an operation of an MS according to the present invention.

The present invention has been described for the case where the MS is the operation subject of classifying the segment types. Another embodiment of the present invention will now be described for the case where the operation subject of classifying the segment types is not the MS, but the BS. With reference to FIG. 11, below is a description of an operation of an MS in an OFDMA communication system according to the present invention. In the MS structure shown in FIGS. 5 and 8, as the operation subject of the segment type classification becomes the BS, the RT/NRT type estimator and the history manager of the MS, described with reference to FIGS. 9 and 10, are included in the elements of the BS. Therefore, the BS performs an operation of estimating segment types, and becomes an operation subject of segment type estimation. Using the MS channel estimator, the BS estimates the channel state and transmits the channel estimation information to the BS.

FIG. 11 is a flowchart schematically illustrating an operation of an MS according to the present invention. Referring to FIG. 11, in step 1101, the MS extracts its channel state information, i.e., an average CINR, an antenna correlation and a moving velocity.

In step 1103, the MS transmits the channel state information to a BS in every frame. Herein, the MS transmits the channel state information at stated periods. Although it is assumed in step 1103 that the transmission period is a frame, the transmission period is subject to change according to negotiation with the BS and system conditions. As to the information that can be transmitted to the BS only once, like the information on the number of antennas, the MS transmits the information to the BS only at the initial access. Therefore, the information on the number of antennas is excludable from the feedback information.

In step 1105, the MS determines whether it has received a segment type change grant message from the BS. If it is determined that the MS has failed to receive the segment type change grant message, the MS proceeds to step 1103. However, upon receipt of the segment type change grant message, the MS proceeds to step 1107. In step 1107, the MS receives data from the BS in the changed segment type.

The operation of the MS in the OFDMA communication system according to the present invention has been described so far with reference to FIG. 11. Next, with reference to FIG. 12, below is a description of an operation of a BS in an OFDMA communication system according to the present invention.

Figure 12:
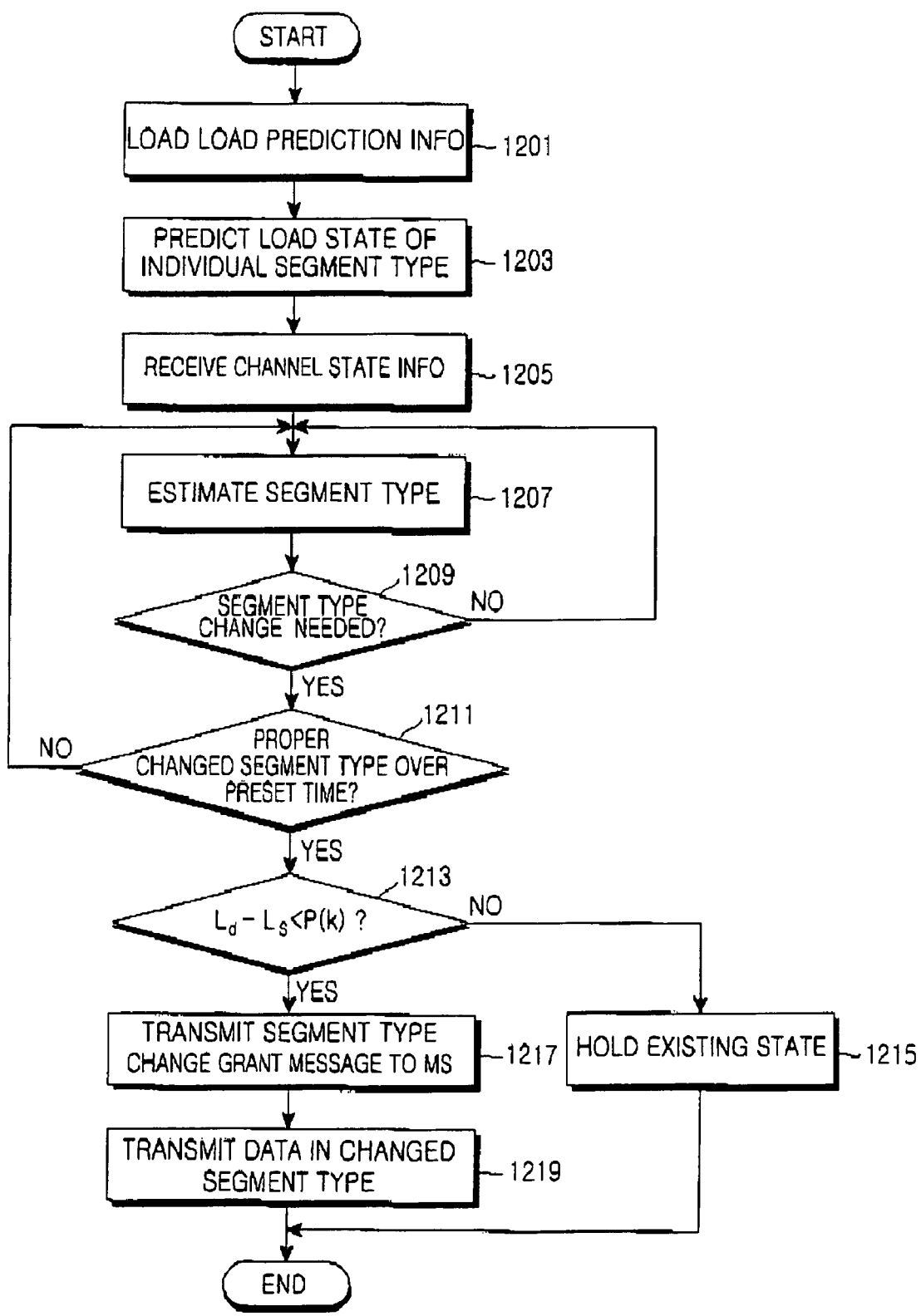
FIG. 12 is a flowchart schematically illustrating an operation of a BS according to the present invention.

FIG. 12 is a flowchart schematically illustrating an operation of a BS according to another embodiment of the present invention.

Referring to FIG. 12, in step 1201, the BS loads load prediction information, i.e., acceptance control information. In step 1203, the BS predicts a load state of each individual segment type. In other words, the BS predicts a prediction load ratio Ld of a desired target segment type and a prediction load ratio Ls of the current segment type.

In step 1205, the BS receives channel state information from the MS. The channel state information received at the BS includes an average CINR, an antenna correlation and moving velocity, and the BS receives information on the number of antennas from the MS at, for example, initial access.

In step 1207, the BS estimates a segment type using the channel state information. Herein, the BS is the operation subject of estimating the segment type using the channel state information. In this case, the structure and function for the segment estimation is included in the BS, and the BS estimates the segment type. The segment type estimation process has been described separately for the RT segment type and the NRT segment type with reference to FIGS. 6 and 7.

In step 1209, the BS determines whether there is a need for a change in the segment type. If it is determined that there is no need for a change in the segment type, the BS proceeds to step 1207. However, if there is a need for a change in the segment type, the BS proceeds to step 1211.

In step 1211, the BS determines whether it is proper to use the changed segment type over a predetermined time Td. If it is determined that it is not proper to use the changed segment type over the predetermined time Td, the BS proceeds to step 1207. However, if it is proper to use the changed segment type over the predetermined time Td, the BS proceeds to step 1213. In step 1213, the BS determines whether a difference between the prediction load ratio Ld of the desired target segment type and the prediction load ratio Ls of the current segment type is lower than a priority P(k) of a corresponding MS#k. If it is determined that the difference between the prediction load ratio Ld of the desired target segment type and the prediction load ratio Ls of the current segment type is less than the priority P(k) of the MS#k, the BS proceeds to step 1217. However, if the difference between the prediction load ratio Ld of the desired target segment type and the prediction load ratio Ls of the current segment type is least the priority P(k) of the MS#k, the BS proceeds to step 1215.

In step 1215, the BS holds the existing state, i.e., maintains the existing segment type.

In step 1217, the BS transmits a segment type change grant message to the MS. In step 1219, the BS changes the segment and transmits data with the changed segment.

Although not separately illustrated, the BS can change each of the segment types taking into account not only the load prediction information but also the current load state.

The operation of the BS in the OFDMA communication system has been described so far with reference to FIG. 12. Next, with reference to FIG. 13, below is a description of a structure of a resource map based on segment types in an OFDMA communication system according to the present invention.

Figure 13:
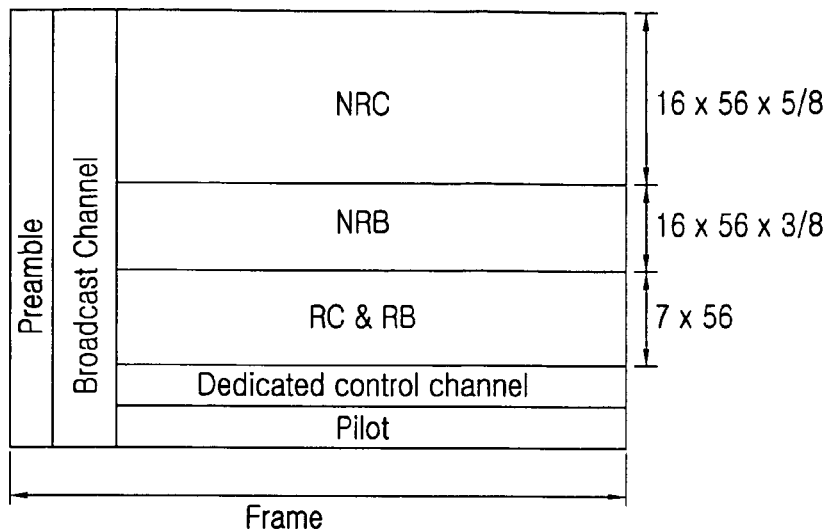
FIG. 13 is a diagram schematically illustrating a structure of a resource map in a downlink frame based on segment types in an OFDMA communication system according to the present invention.

FIG. 13 is a diagram schematically illustrating a structure of a resource map in a downlink frame based on segment types in an OFDMA communication system according to the present invention.

Before a description of FIG. 13, it should be noted that when data transmission/reception is constantly performed through the segment allocation, there is a possible load imbalance for each individual segment type due to an increase in the number of users. Although it is possible to guarantee a high QoS for the segment type with a low load, it is not possible to guarantee the high QoS for the segment type with a high load. Therefore, when there is a load imbalance for each individual segment type, it is necessary to provide a proper resource map according to the current load state, for load balancing.

Referring to FIG. 13, there is illustrated a downlink frame structure for the OFDMA communication system. It is possible to provide various resource maps to the traffic channel according to a ratio of the data. The various resource maps based on the ratio of the data are used for load balancing through map modification.

The structures of the various resource maps based on the ratio of the segment type are predefined between a BS and an MS, and the BS transmits a unique number associated with a structure of an appropriate resource map to all MSs in its coverage over a broadcast channel at stated periods, e.g., every frame, according to distribution of the current data. The MS recognizes the change in the resource map through the broadcast channel, and receives traffic transmitted thereto on the changed resource map. However, an initial resource map is established according to distribution of RT and NRT data and the average number of users with the NRC segment type and NRB segment type in the cell.

A structure of a resource map based on the segment types is illustrated in FIG. 13, by way of example, wherein a ratio of the RT segment type to the NRT segment type is 7:16 and a ratio of the NRC segment type to the NRB segment type is 5:3. A size of a frequency domain of one cluster, as described above, is 56, and it is illustrated that the segment types are allocated to the resource map according thereto. The resource map with this structure is applied to the environment where the amount of data in the NRT segment type is greater than the amount of data in the RT segment type and the NRC data is greater than the amount of NRB data in the NRT data.

The resource map structure based on the size of the frequency domain and the segment types, illustrated in FIG. 13, has been described by way of example. The resource map structure is not restrictive, but variable according to the OFDMA system characteristics.

The structure of the resource map based on segment types in the OFDMA communication system according to an embodiment of the present invention has been described so far with reference to FIG. 13. Next, with reference to FIG. 14, below is a schematic description of a change in the resource map in the OFDMA communication system according to an embodiment of the present invention.

Figures 14A, 14B:
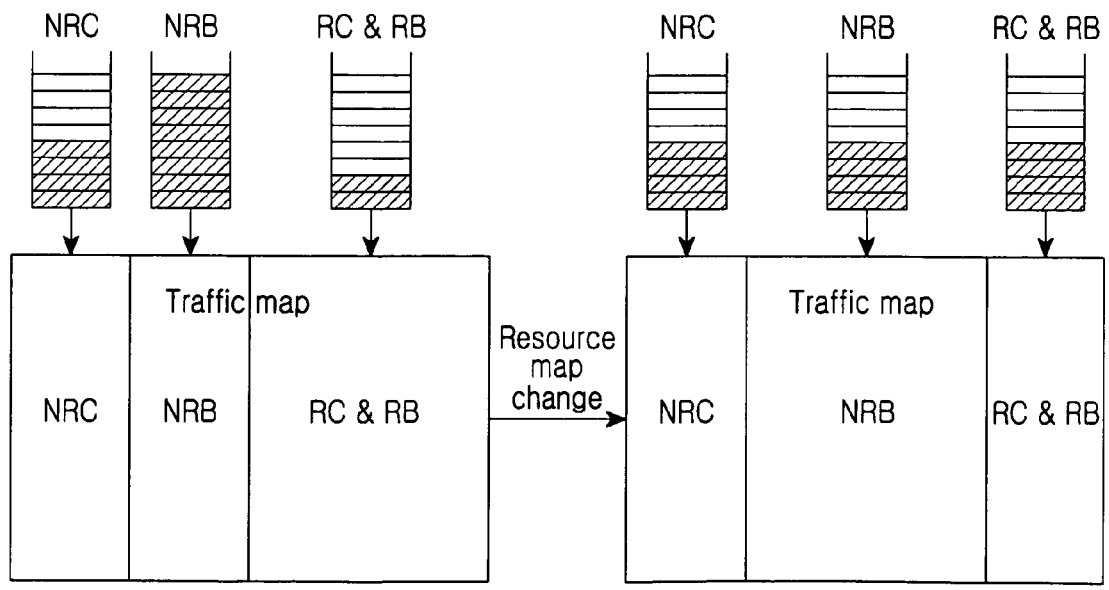
FIG. 14 is a diagram schematically illustrating a resource map changed for load balancing in an OFDMA communication system according to the present invention.

FIG. 14 is a diagram schematically illustrating a resource map changed for load balancing in an OFDMA communication system according to the present invention.

Referring to FIG. 14, a great load of data in the NRB segment type is generated in the resource map shown in (a). At this moment, the resource map is changed to the resource map shown in (b) where a ratio of the NRB segment type is high, achieving load balancing. In this case, a resource map manager of the BS checks a state of a queue for each individual segment type, and changes the resource map if a difference between a buffer occupancy ratio Lmax in the queue for the segment type with the maximum load and a buffer occupancy ratio Lmin in the queue for the segment type with the minimum load exceeds a preset threshold T (Lmax−Lmin>T). Through the change in the resource map, the load based on each segment type can have a constant value after a lapse of a preset time. At this time, the RC traffic and the RB traffic share the queue as they share the resource map.

As can be understood from the foregoing description, the present invention proposes a scheme for transmitting/receiving data using several segment types in an OFDMA communication system. Therefore, the present invention can set the segment types according to channel state, for data transmission. In particular, when an MS of the communication system is an operation subject of the segment type selection, the amount of the signal transmitted to the BS decreases. In addition, the BS defines a plurality of resource maps in the downlink channel to achieve load balancing on the data based on the segment types, for data transmission/reception.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An operation method of a mobile subscriber (MS) for data exchange between the MS and a base station (BS) in a multicarrier communication system including the MS, and the BS providing a service to the MS, the method comprising the steps of:

dividing a full frequency band of the communication system into a plurality of sub-carrier frequency bands, generating a plurality of segments having a frequency domain and a time domain occupied by a predetermined number of sub-frequency bands and a predetermined number of time intervals, and classifying a plurality of segment types according to each of the segments, for data transmission, wherein the plurality of segment types comprise at least one realtime segment type and at least one non-realtime segment type;

measuring a channel state and extracting channel state information corresponding to the channel state;

estimating a segment type using the extracted channel state information, and determining whether there is a need for a change in a segment type currently allocated to the MS;

if there is a need for a change in the segment type, transmitting a segment type change request message to the BS; and upon receiving a segment type change grant message from the BS in response to the segment type change request message, receiving data in a segment type corresponding to the received segment type change grant message.

2. The operation method of claim 1, wherein the plurality of segment types comprise a non-realtime cell center segment type, a realtime cell center segment type, a non-realtime cell boundary segment type, and a realtime cell boundary segment type, which are differentiated in accordance with a delay tolerance condition of transmission data and a distance between the MS and the BS.

3. The operation method of claim 1, wherein the channel state information includes at least one of an average carrier-to-interference and noise ratio (CINR), an antenna correlation, a moving velocity, and the number of antennas.

4. The operation method of claim 1, further comprising, if there is a need for a change in the segment type, determining whether there is a proper segment type to be changed over a predetermined time.

5. The operation method of claim 1, wherein for realtime data, the step of estimating a segment type comprises:
 receiving channel state information, and setting a realtime cell boundary segment type if the number of antennas is one;
 setting a realtime cell boundary segment type if an antenna correlation is greater than or equal to a predetermined reference antenna correlation;
 setting a realtime cell boundary segment type if the number of antennas is greater than or equal to two and an average CINR is less than or equal to a predetermined reference CINR; and
 setting a realtime cell center segment type if the number of antennas is greater than or equal to two and the average CINR exceeds the reference CINR.

6. The operation method of claim 5, wherein the realtime cell center segment type is a cell center segment type obtained by extending a spatial channel according to the number of antennas.

7. The operation method of claim 1, wherein for non-realtime data, the step of estimating a segment type comprises:
 receiving channel state information, and setting a non-realtime cell boundary segment type if a moving velocity of the MS is greater than or equal to a reference moving velocity;
 setting a non-realtime cell boundary segment type if an antenna correlation is greater than or equal to a predetermined reference antenna correlation;
 setting a non-realtime cell boundary segment type if an average CINR is less than or equal to a predetermined reference CINR; and
 setting a non-realtime cell center segment type if the average CINR exceeds the reference CINR.

8. An operation method of a base station (BS) for data exchange between a mobile subscriber (MS) and the BS in a multicarrier communication system including the MS, and the BS providing a service to the MS, the method comprising the steps of:
 dividing a full frequency band of the communication system into a plurality of sub-carrier frequency bands, generating a plurality of segments having a frequency domain and a time domain occupied by a predetermined number of sub-frequency bands and a predetermined number of time intervals, and classifying a plurality of segment types according to each of the segments, for data transmission, wherein the plurality of segment types comprise at least and at least one non-realtime segment type;
 predicting a load state of each individual segment type using load prediction information, and receiving a segment type change request message;
 determining whether it is possible to change a segment type in response to the segment type change request;
 if it is possible to change a segment type, transmitting a segment type change grant message to the MS and transmitting data to the MS in the changed segment type; and
 if it is not possible to change a segment type, transmitting data in an existing segment type.

9. The operation method of claim 8, wherein the plurality of segment types comprise a non-realtime cell center segment type, a realtime cell center segment type, a non-realtime cell boundary segment type, and a realtime cell boundary segment type, which are differentiated in accordance with a delay tolerance condition of transmission data and a distance between the MS and the BS.

10. The operation method of claim 8, wherein the step of determining whether it is possible to change a segment type comprises:
 determining possibility of a change in segment type if a difference between a prediction load ratio of a desired target segment type and a prediction load ratio of a current segment type is less than a priority of the MS that transmitted the segment type change request message; and
 determining impossibility of a change in segment type if the difference between the prediction load ratio of the desired target segment type and the prediction load ratio of the current segment type is greater than or equal to the priority of the MS that transmitted the segment type change request message.

11. The operation method of claim 8, wherein the step of transmitting data using a segment type comprises transmitting data using a map structure for load balancing.

12. The operation method of claim 11, wherein the map is classified into a realtime segment type, a non-realtime cell center segment type, and a non-realtime cell boundary segment type.

13. The operation method of claim 11, wherein the structure of the map for transmitting a plurality of segment types according to a ratio of the segment types is predetermined between the BS and the MS.

14. The operation method of claim 11, wherein the map structure is changed if a difference between a buffer occupancy ratio in a queue for a segment type with a maximum load and a buffer occupancy ratio in a queue for a segment type with a minimum load is greater than or equal to a predetermined threshold.

15. The operation method of claim 11, wherein the BS transmits a structure of a proper resource map to an MS in its coverage at predetermined periods according to distribution of current data.

16. An operation method of a mobile subscriber (MS) for data exchange between the MS and a base station (BS) in a multicarrier communication system including the MS, and the BS providing a service to the MS, the method comprising the steps of:
 dividing a full frequency band of the communication system into a plurality of sub-carrier frequency bands, generating a plurality of segments having a frequency domain and a time domain occupied by a predetermined number of sub-frequency bands and a predetermined number of time intervals, and classifying a plurality of segment types according to each of the segments, for data transmission, wherein the plurality of segment types comprise at least one realtime segment type and at least one non-realtime segment type;
 measuring a channel state and extracting channel state information corresponding to the channel state; and
 upon receiving a segment type change grant message from the BS after transmitting the extracted channel state information to the BS, receiving data in a segment type corresponding to the received segment type change grant message.

17. The operation method of claim 16, wherein the plurality of segment types comprise a non-realtime cell center segment type, a realtime cell center segment type, a non-realtime cell boundary segment type, and a realtime cell boundary segment type, which are differentiated in accordance with a delay tolerance condition of transmission data and a distance between the MS and the BS.

18. The operation method of claim 16, wherein the channel state information includes at least one of an average carrier-to-interference and noise ratio (CINR), an antenna correlation, a moving velocity, and the number of antennas.

19. An operation method of a base station (BS) for data exchange in a multicarrier communication system including a mobile subscriber (MS), and the BS providing a service to the MS, the method comprising the steps of:
dividing a full frequency band of the communication system into a plurality of sub-carrier frequency bands, generating a plurality of segments having a frequency domain and a time domain occupied by a predetermined number of sub-frequency bands and a predetermined number of time intervals, and classifying a plurality of segment types according to each of the segments, for data transmission, wherein the plurality of segment types comprise at least one realtime segment type and at least one non-realtime segment type;
predicting a load state of each individual segment type using load prediction information, and receiving channel state information;
estimating a segment type using the channel state information to determine whether there is a need for a change in a segment type allocated to the MS;
if there is a need for a change in the segment type, determining whether it is possible to change the segment type;
if it is possible to change the segment type, transmitting a segment type change grant message to the MS and transmitting data to the MS in the changed segment type; and
if it is not possible to change the segment type, transmitting data in an existing segment type.

20. The operation method of claim 19, wherein the plurality of segment types comprise a non-realtime cell center segment type, a realtime cell center segment type, a non-realtime cell boundary segment type, and a realtime cell boundary segment type, which are differentiated in accordance with a delay tolerance condition of transmission data and a distance between the MS and the BS.

21. The operation method of claim 19, wherein the channel state information includes at least one of an average carrier-to-interference and noise ratio (CINR), an antenna correlation, a moving velocity, and the number of antennas.

22. The operation method of claim 19, further comprising, if there is a need for a change in the segment type, determining whether there is a proper segment type to be changed over a predetermined time.

23. The operation method of claim 19, wherein for realtime data, the step of estimating a segment type comprises:
receiving channel state information, and setting a realtime cell boundary segment type if the number of antennas is one;
setting a realtime cell boundary segment type if an antenna correlation is greater than or equal to a predetermined reference antenna correlation;
setting a realtime cell boundary segment type if the number of antennas is greater than or equal to two and an average CINR is less than or equal to a predetermined reference CINR; and
setting a realtime cell center segment type if the number of antennas is greater than or equal to two and the average CINR exceeds the reference CINR.

24. The operation method of claim 23, wherein the realtime cell center segment type is a cell center segment type obtained by extending a spatial channel according to the number of antennas.

25. The operation method of claim 19, wherein for non-realtime data, the step of estimating a segment type comprises:
receiving channel state information, and setting a non-realtime cell boundary segment type if a moving velocity of the MS is greater than or equal to a reference moving velocity;
setting a non-realtime cell boundary segment type if an antenna correlation is greater than or equal to a predetermined reference antenna correlation;
setting a non-realtime cell boundary segment type if an average CINR is less than or equal to a predetermined reference CINR; and
setting a non-realtime cell center segment type if the average CINR exceeds the reference CINR.

26. The operation method of claim 19, wherein the step of determining whether it is possible to change a segment type comprises:
determining a possibility of a change in segment type if a difference between a prediction load ratio of a desired target segment type and a prediction load ratio of a current segment type is less than a priority of the MS that transmitted a segment type change request message; and
determining impossibility of a change in segment type if the difference between the prediction load ratio of the desired target segment type and the prediction load ratio of the current segment type is greater than or equal to the priority of the MS that transmitted the segment type change request message.

27. The operation method of claim 19, wherein the step of transmitting data using a segment type comprises transmitting data using a map structure for load balancing.

28. The operation method of claim 27, wherein the map is classified into a realtime segment type, a non-realtime cell center segment type, and a non-realtime cell boundary segment type.

29. The operation method of claim 27, wherein the structure of the map for transmitting a plurality of segment types according to a ratio of the segment types is predetermined between the BS and the MS.

30. The operation method of claim 27, wherein the map structure is changed if a difference between a buffer occupancy ratio in a queue for a segment type with a maximum load and a buffer occupancy ratio in a queue for a segment type with a minimum load is greater than or equal to a predetermined threshold.

31. The operation method of claim 27, wherein the BS transmits a structure of a proper resource map to an MS in its coverage at predetermined periods according to distribution of current data.

32. A data exchange system in a multicarrier communication system including a mobile subscriber (MS) and a base station (BS) providing a service to the MS;
wherein the data exchange system divides a full frequency band of the communication system into a plurality of sub-carrier frequency bands, generates a plurality of segments having a frequency domain and a time domain occupied by a predetermined number of sub-frequency bands and a predetermined number of time intervals, and classifies a plurality of segment types according to each of the segments, for data transmission;

wherein the MS comprises:

a channel state information extractor for measuring a channel state and extracting channel state information corresponding to the channel state;

a realtime segment type estimator for setting a realtime segment type using the extracted channel state information;

a non-realtime segment type estimator for setting a non-realtime segment type using the channel state information; and a history manager for determining whether there is a need for a change in the segment types set in the realtime segment type estimator and the non-realtime segment type estimator, and transmitting a segment type change request message to the BS if there is a need for a change in the segment types.

33. The data exchange system of claim 32, wherein the plurality of segment types comprise a non-realtime cell center segment type, a realtime cell center segment type, a non-realtime cell boundary segment type, and a realtime cell boundary segment type, which are differentiated in accordance with a delay tolerance condition of transmission data and a distance between the MS and the BS.

34. The data exchange system of claim 32, wherein the channel state information includes at least one of an average carrier-to-interference and noise ratio (CINR), an antenna correlation, a moving velocity, and the number of antennas.

35. The data exchange system of claim 32, wherein the realtime segment type estimator comprises:

receiving channel state information, and setting a realtime cell boundary segment type if the number of antennas is one;

setting a realtime cell boundary segment type if an antenna correlation is higher than or equal to a predetermined reference antenna correlation;

setting a realtime cell boundary segment type if the number of antennas is greater than or equal to two and an average CINR is less than or equal to a predetermined reference CINR; and setting a realtime cell center segment type if the number of antennas is greater than or equal to two and the average CINR exceeds the reference CINR.

36. The data exchange system of claim 32, wherein the realtime cell center segment type set by the realtime segment type estimator is a cell center segment type obtained by extending a spatial channel according to the number of antennas.

37. The data exchange system of claim 32, wherein the non-realtime segment type estimator comprises:

receiving channel state information, and setting a non-realtime cell boundary segment type if a moving velocity of the MS is greater than or equal to a reference moving velocity;

setting a non-realtime cell boundary segment type if an antenna correlation is greater than or equal to a predetermined reference antenna correlation;

setting a non-realtime cell boundary segment type if an average CINR is less than or equal to a predetermined reference CINR; and setting a non-realtime cell center segment type if the average CINR exceeds the reference CINR.

38. A data exchange system in a multicarrier communication system including a mobile subscriber (MS) and a base station (BS) providing a service to the MS;

wherein the data exchange system divides a full frequency band of the communication system into a plurality of sub-carrier frequency bands, generates a plurality of segments having a frequency domain and a time domain occupied by a predetermined number of sub-frequency bands and a predetermined number of time intervals, and classifies a plurality of segment types according to each of the segments, for data transmission, wherein the plurality of segment types comprise at least one realtime segment type and at least one non-realtime segment type;

wherein the BS comprises:

a scheduler for classifying data to be transmitted to the MS into each segment type, and scheduling the data according to each segment type using a preset scheduling scheme;

a type change manager for receiving a segment type change request message from the MS, predicting a load state of each individual segment type using load prediction information, determining whether it is possible to change a segment type in response to the segment type change request message, and transmitting a segment type change grant message to the MS if it is possible to change the segment type;

a queue state manager for managing a queue state according to the segment type classification, and generating information on the queue state according to each segment type; and a resource map manager for receiving a segment type change command from the type change manager and managing a resource map so as to keep load balancing for each individual segment type.

39. The data exchange system of claim 38, wherein the plurality of segment types comprise a non-realtime cell center segment type, a realtime cell center segment type, a non-realtime cell boundary segment type, and a realtime cell boundary segment type, which are differentiated in accordance with a delay tolerance condition of transmission data and a distance between the MS and the BS.

40. The data exchange system of claim 38, wherein the scheduler comprises:

a master scheduler for classifying input data into a realtime segment type and a non-realtime segment type, and classifying the input data into a non-realtime cell center segment type, a realtime cell center segment type, a non-realtime cell boundary segment type and a realtime cell boundary segment type under the control of the type change manager; and a packet scheduler for performing scheduling on the segment types using a preset scheduling scheme.

41. The data exchange system of claim 38, wherein the type change manager determines whether to change a segment type using a difference between a prediction load ratio of a desired target segment type and a prediction load ratio of a current segment type and a priority of the MS that transmitted the segment type change request message.

42. The data exchange system of claim 38, wherein the resource map manager transmits data using a map structure for load balancing.

43. The data exchange system of claim 42, wherein the map is classified into a realtime segment type, a non-realtime cell center segment type, and a non-realtime cell boundary segment type.

44. The data exchange system of claim 42, wherein the structure of the map for transmitting a plurality of segment types according to a ratio of the segment types is predetermined between the BS and the MS.

45. The data exchange system of claim 42, wherein the resource map manager changes the map structure if a difference between a buffer occupancy ratio in a queue for a segment type with a maximum load and a buffer occupancy ratio in a queue for a segment type with a minimum load is greater than or equal to a predetermined threshold.

46. The data exchange system of claim 42, wherein the BS transmits a structure of a proper resource map to an MS in its coverage at predetermined periods according to distribution of current data.

47. A data exchange system in a multicarrier communication system including a mobile subscriber (MS) and a base station (BS) providing a service to the MS;
wherein the data exchange system divides a full frequency band of the communication system into a plurality of sub-carrier frequency bands, generates a plurality of segments having a frequency domain and a time domain occupied by a predetermined number of sub-frequency bands and a predetermined number of time intervals, and classifies a plurality of segment types according to each of the segments, for data transmission, wherein the plurality of segment types comprise at least one realtime segment type and at least one non-realtime segment type;
wherein the MS includes a channel state information extractor for measuring a channel state, extracting channel state information corresponding to the channel state, and transmitting the channel state information to the BS.

48. The data exchange system of claim 47, wherein the plurality of segment types comprise a non-realtime cell center segment type, a realtime cell center segment type, a non-realtime cell boundary segment type, and a realtime cell boundary segment type, which are differentiated in accordance with a delay tolerance condition of transmission data and a distance between the MS and the BS.

49. The data exchange system of claim 47, wherein the channel state information includes at least one of an average carrier-to-interference and noise ratio (CINR), an antenna correlation, a moving velocity, and the number of antennas.

50. A data exchange system in a multicarrier communication system including a mobile subscriber (MS) and a base station (BS) providing a service to the MS;
wherein the data exchange system divides a full frequency band of the communication system into a plurality of sub-carrier frequency bands, generates a plurality of segments having a frequency domain and a time domain occupied by a predetermined number of sub-frequency bands and a predetermined number of time intervals, and classifies a plurality of segment types according to each of the segments, for data transmission;
wherein the BS comprises:
a non-realtime segment type estimator for receiving channel state information from the MS and setting a non-realtime segment type;
a history manager for determining whether there is a need for a change in the segment types set in a realtime segment type estimator and the non-realtime segment type estimator;
a scheduler for classifying data to be transmitted to the MS into each segment type, and scheduling the data according to each segment type using a preset scheduling scheme;
a type change manager for predicting a load state of each individual segment type using load prediction information, and transmitting a segment type change grant message to the BS if the history manager determines that it is possible to change the segment type;
a queue state manager for managing a queue state based on the segment type classification, and generating information on the queue state according to each segment type; and
a resource map manager for receiving a segment type change command from the type change manager and managing a resource map so as to keep load balancing for each individual segment type.

51. The data exchange system of claim 50, wherein the plurality of segment types comprise a non-realtime cell center segment type, a realtime cell center segment type, a non-realtime cell boundary segment type, and a realtime cell boundary segment type, which are differentiated in accordance with a delay tolerance condition of transmission data and a distance between the MS and the BS.

52. The data exchange system of claim 50, wherein the channel state information includes at least one of an average carrier-to-interference and noise ratio (CINR), an antenna correlation, a moving velocity, and the number of antennas.

53. The data exchange system of claim 50, wherein the realtime segment type estimator comprises:
receiving channel state information, and setting a realtime cell boundary segment type if the number of antennas is one;
setting a realtime cell boundary segment type if an antenna correlation is greater than or equal to a predetermined reference antenna correlation;
setting a realtime cell boundary segment type if the number of antennas is greater than or equal to two and an average CINR is less than or equal to a predetermined reference CINR; and
setting a realtime cell center segment type if the number of antennas is greater than or equal to two and the average CINR exceeds the reference CINR.

54. The data exchange system of claim 53, wherein the realtime cell center segment type set by the realtime segment type estimator is a cell center segment type obtained by extending a spatial channel according to the number of antennas.

55. The data exchange system of claim 50, wherein the non-realtime segment type estimator comprises:
receiving channel state information, and setting a non-realtime cell boundary segment type if a moving velocity of the MS is greater than or equal to a reference moving velocity;
setting a non-realtime cell boundary segment type if an antenna correlation is greater than or equal to a predetermined reference antenna correlation;
setting a non-realtime cell boundary segment type if an average CINR is less than or equal to a predetermined reference CINR; and
setting a non-realtime cell center segment type if the average CINR exceeds the reference CINR.

56. The data exchange system of claim 50, wherein the scheduler comprises:
a master scheduler for classifying input data into a realtime segment type and a non-realtime segment type, and classifying the input data into a non-realtime cell center segment type, a realtime cell center segment type, a non-realtime cell boundary segment type and a realtime cell boundary segment type under the control of the type change manager; and a packet scheduler for performing scheduling on the segment types using a preset scheduling scheme.

57. The data exchange system of claim 50, wherein the type change manager determines whether to change a segment type using a difference between a prediction load ratio of a desired target segment type and a prediction load ratio of a current segment type and a priority of the MS that transmitted a segment type change request message.

58. The data exchange system of claim 50, wherein the resource map manager transmits data using a map structure for load balancing.

59. The data exchange system of claim 58, wherein the map is classified into a realtime segment type, a non-realtime cell center segment type, and a non-realtime cell boundary segment type.

60. The data exchange system of claim 58, wherein the structure of the map for transmitting a plurality of segment types according to a ratio of the segment types is predetermined between the BS and the MS.

61. The data exchange system of claim 58, wherein the resource map manager changes the map structure if a difference between a buffer occupancy ratio in a queue for a segment type with a maximum load and a buffer occupancy ratio in a queue for a segment type with a minimum load is greater than or equal to a predetermined threshold.

62. The data exchange system of claim 58, wherein the BS transmits a structure of a proper resource map to an MS in its coverage at predetermined periods according to distribution of current data.

* * * * *